(12) United States Patent
Doshi et al.

(10) Patent No.: US 11,139,991 B2
(45) Date of Patent: Oct. 5, 2021

(54) DECENTRALIZED EDGE COMPUTING TRANSACTIONS WITH FINE-GRAINED TIME COORDINATION

(71) Applicant: Intel Corporation, Santa Clara, CA (US)

(72) Inventors: Kshitij Arun Doshi, Tempe, AZ (US); Ned M. Smith, Beaverton, OR (US); Francesc Guim Bernat, Barcelona (ES); Kevin B. Stanton, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 111 days.

(21) Appl. No.: 16/722,917

(22) Filed: Dec. 20, 2019

(65) Prior Publication Data

US 2020/0127861 A1     Apr. 23, 2020

Related U.S. Application Data

(60) Provisional application No. 62/907,597, filed on Sep. 28, 2019, provisional application No. 62/939,303, filed on Nov. 22, 2019.

(51) Int. Cl.
*H04L 29/06* (2006.01)
*H04L 9/32* (2006.01)
(Continued)

(52) U.S. Cl.
CPC ............ *H04L 9/3297* (2013.01); *G06F 8/443* (2013.01); *G06F 9/3836* (2013.01);
(Continued)

(58) Field of Classification Search
None
See application file for complete search history.

(56) References Cited

U.S. PATENT DOCUMENTS 9,928,264 B2    3/2018   Lomet et al.
2007/0208944 A1*  9/2007   Pavlicic ................ G06F 21/645
                                    713/176
(Continued)

FOREIGN PATENT DOCUMENTS

WO    2020226979    11/2020

OTHER PUBLICATIONS

Lomet, David, "Multi-Version Concurrency via Timestamp Range Conflict Management", Microsoft Research, (2012), 12 pgs.
(Continued)

*Primary Examiner* — Andrew J Steinle
(74) *Attorney, Agent, or Firm* — Schwegman Lundberg & Woessner, P.A.

(57) ABSTRACT

Various approaches for coordinating edge computing transactions are described, based on the generation and verification of fine-grained timestamp values among distributed computing entities in an edge computing system. In an edge computing system, an edge computing device performs operations to obtain transaction data, a timestamp, and a timestamp signature for a transaction, with the timestamp generated from a secure (and attestable) timestamp procedure that is coordinated with another entity (including via a network-coordinated timestamp synchronization). This timestamp is verified by the device based on the timestamp signature and the transaction data for the transaction, and the transaction is conducted (e.g., using a value of the timestamp) at the device or elsewhere in the system based on successful verification. In further examples, the coordinated timestamp enables multi-version concurrency control (MVCC) database transactions, verification of blockchain transactions, or other uses and verifications of timestamp values.

25 Claims, 12 Drawing Sheets

(51) Int. Cl.

| | | |
|---|---|---|
| G06F 12/14 | (2006.01) | |
| H04L 9/08 | (2006.01) | |
| G06F 9/455 | (2018.01) | |
| G06F 16/18 | (2019.01) | |
| G06F 16/23 | (2019.01) | |
| G06F 11/10 | (2006.01) | |
| H04L 9/06 | (2006.01) | |
| H04L 12/24 | (2006.01) | |
| H04L 12/26 | (2006.01) | |
| H04L 29/08 | (2006.01) | |
| G06F 9/54 | (2006.01) | |
| G06F 21/60 | (2013.01) | |
| H04L 9/00 | (2006.01) | |
| H04L 12/911 | (2013.01) | |
| G06F 8/41 | (2018.01) | |
| G06F 9/38 | (2018.01) | |
| G06F 9/445 | (2018.01) | |
| G06F 9/48 | (2006.01) | |
| G06F 9/50 | (2006.01) | |
| G06F 11/34 | (2006.01) | |
| G16Y 40/10 | (2020.01) | |

(52) U.S. Cl.
CPC ...... *G06F 9/44594* (2013.01); *G06F 9/45533* (2013.01); *G06F 9/4881* (2013.01); *G06F 9/505* (2013.01); *G06F 9/544* (2013.01); *G06F 11/1004* (2013.01); *G06F 11/3433* (2013.01); *G06F 12/1408* (2013.01); *G06F 16/1865* (2019.01); *G06F 16/2322* (2019.01); *G06F 21/602* (2013.01); *H04L 9/008* (2013.01); *H04L 9/0637* (2013.01); *H04L 9/0822* (2013.01); *H04L 9/0825* (2013.01); *H04L 9/0866* (2013.01); *H04L 41/0893* (2013.01); *H04L 41/0896* (2013.01); *H04L 41/142* (2013.01); *H04L 41/145* (2013.01); *H04L 41/5009* (2013.01); *H04L 41/5025* (2013.01); *H04L 41/5051* (2013.01); *H04L 43/08* (2013.01); *H04L 47/822* (2013.01); *H04L 63/0407* (2013.01); *H04L 63/0428* (2013.01); *H04L 63/1408* (2013.01); *H04L 63/20* (2013.01); *H04L 67/1008* (2013.01); *H04L 67/12* (2013.01); *H04L 67/141* (2013.01); *G06F 2209/509* (2013.01); *G16Y 40/10* (2020.01); *H04L 67/10* (2013.01); *H04L 2209/127* (2013.01)

(56) References Cited

U.S. PATENT DOCUMENTS

| | | | |
|---|---|---|---|
| 2011/0161672 A1* | 6/2011 | Martinez | H04L 63/08 713/176 |
| 2011/0296019 A1 | 12/2011 | Ferris et al. | |
| 2012/0303818 A1 | 11/2012 | Thibeault et al. | |
| 2018/0285009 A1 | 10/2018 | Guim Bernat et al. | |
| 2018/0322158 A1 | 11/2018 | Zhang et al. | |
| 2019/0236562 A1 | 8/2019 | Padmanabhan | |
| 2020/0067907 A1* | 2/2020 | Avetisov | H04L 9/3218 |

OTHER PUBLICATIONS

Zhou, Xuan, "Decentralizing MVCC by Leveraging Visibility", East China Normal University, (Jun. 5, 2018), 14 pgs.

"U.S. Appl. No. 17/119,785, Preliminary Amendment filed", 7 pgs.

"International Application Serial No. PCT US2020 030554, International Search Report dated Jan. 15, 2021", 5 pgs.

"International Application Serial No. PCT US2020 030554, Written Opinion dated Jan. 15, 2021", 6 pgs.

Guangshun, Li, "Method of Resource Estimation Based on QoS in Edge Computing, Published in: Hindawi Wireless Communications and Mobile Computing", (Jan. 22, 2018).

Hesham, El-Sayed, "Edge of Things: The Big Picture on the Integration of Edge, IoT and the Cloud in a Distributed Computing Environment", (Feb. 14, 2018).

* cited by examiner

DECENTRALIZED EDGE COMPUTING TRANSACTIONS WITH FINE-GRAINED TIME COORDINATION

PRIORITY APPLICATIONS

This application claims the benefit of priority to U.S. Provisional Application Ser. No. 62/907,597, filed Sep. 28, 2019 and to U.S. Provisional Application Ser. No. 62/939,303, filed Nov. 22, 2019, all of which are incorporated herein by reference in their entirety.

TECHNICAL FIELD

Embodiments described herein generally relate to data processing, network communication, and computer architecture implementations, and in particular, to operations involving the generation and use of timestamps and time information in edge computing nodes within edge computing systems.

BACKGROUND

Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

Edge computing use cases in mobile network settings have been developed for integration with multi-access edge computing (MEC) approaches, also known as "mobile edge computing." MEC approaches are designed to allow application developers and content providers to access computing capabilities and an information technology (IT) service environment in dynamic mobile network settings at the edge of the network. Limited standards have been developed by the European Telecommunications Standards Institute (ETSI) industry specification group (ISG) in an attempt to define common interfaces for operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations and concerns with orchestration, functional coordination, and resource management, especially in complex mobility settings where many participants (devices, hosts, tenants, service providers, operators) are involved. This complexity is increased in settings where services are offered in an "Edge as a Service" (EaaS) system configuration, where scalable edge computing resources are offered and managed in a way that presents the resources to users as a coordinated "service" available to perform workloads, rather than as resources located among a set of distributed and separated nodes.

The deployment of various Edge, EaaS, MEC, and Fog networks, devices, and services have introduced a number of advanced use cases and distributed computing scenarios occurring at and towards the edge of the network. However, these advanced use cases have also introduced a number of corresponding technical challenges relating to security, processing and network resources, service availability and efficiency, among many other issues. One such challenge is in relation to the various types of distributed transactions that must be coordinated, and whose data results must be updated in a consistent manner among multiple entities in order to properly perform services and accomplish workload processing. However, due to the disparate nature of distributed processing, such coordination and consistency management often encounters a number of challenges and limitations.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
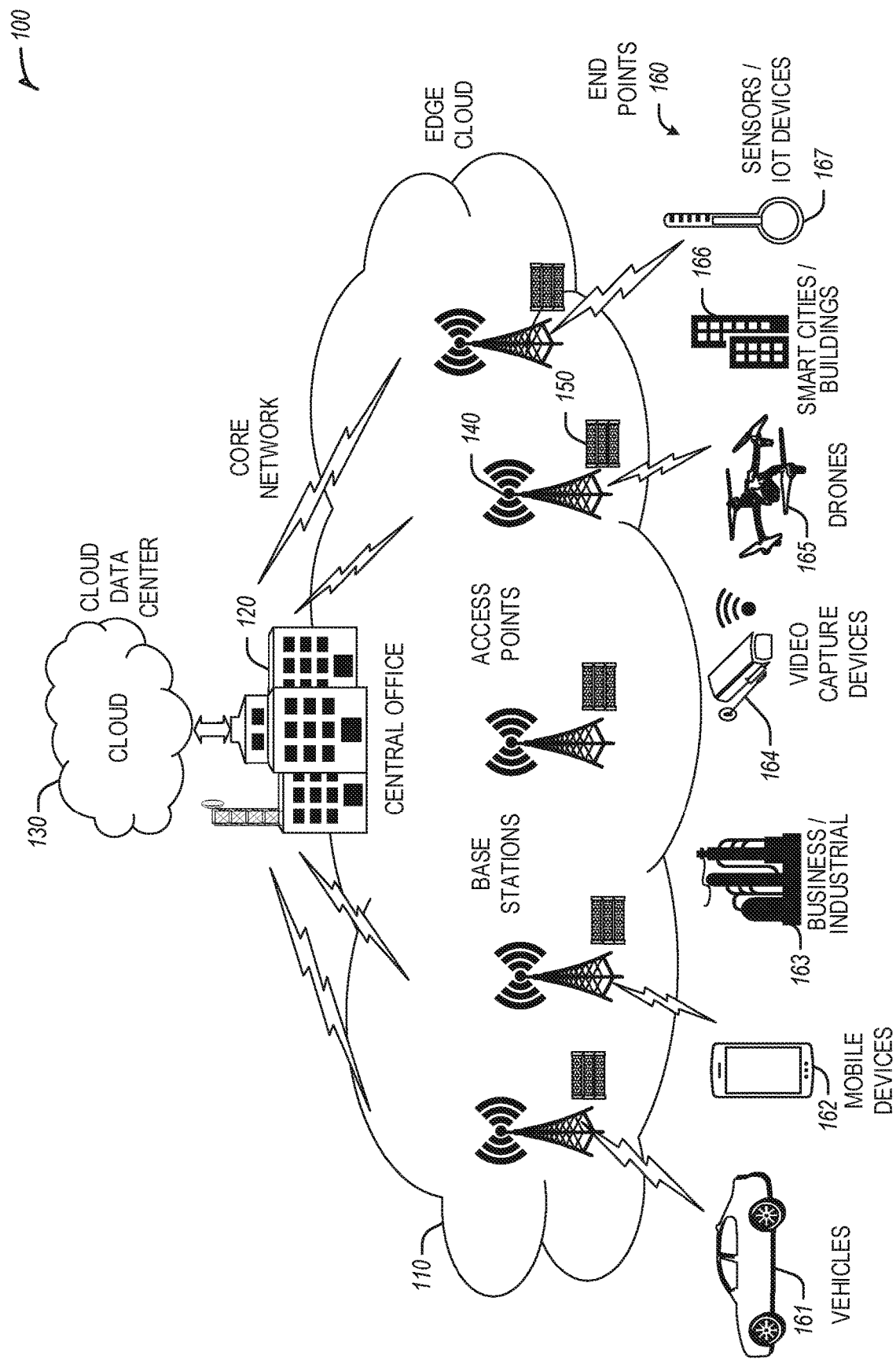
FIG. 1 illustrates an overview of an edge cloud configuration for edge computing, according to an example.

In the following description, methods, configurations, and related apparatuses are disclosed for the generation, verification, and use of high-resolution timestamps in edge computing architectures and system deployments. These timestamps enable a variety of distributed compute use cases in edge computing scenarios, where data operations and data management can be coordinated and verified among multiple systems on the basis of time.

Among other uses, the following techniques for generating and verifying timestamps may significantly assist the use of multi-version transaction tracking, such as in the form of multi-version concurrency control (MVCC) employed with some distributed edge computing transactions. In distributed database management systems, MVCC protocols are often used to perform "optimistic concurrency" transactions. These protocols use versioning over database contents, based on time versions, and can run multiple read or write operations over the database contents without forcing serialization or exclusion control that may be lock-based, event-based, token-based, etc. Transactions may thus overlap one another so long as they do not produce inconsistent accesses to data. While MVCC allows better concurrency, existing methods for verifying that provisional transactions are valid (and will not produce inconsistent overlaps) and can be accepted for commitment are not straightforward and can take significant time and effort per transaction. Many database systems therefore employ a mix of version-based and controlled exclusion-based concurrency or consistency controls.

Many of the techniques used for transaction coordination in edge computing have simply followed the techniques employed for transactions in traditional data center clouds. As various examples, Google Spanner, MemcacheDB, RocksDB, Amazon Dynamo, Redis, are various forms of highly scalable and distributable databases. Of these examples, Google Spanner operates as a true consistency (transactional consistency) ACID database (a database with atomicity, consistency, isolation, and durability properties) with full SQL semantics. In contrast, Amazon Dynamo uses relaxed consistency, including write reconciliation policies which makes it particularly resilient to large scale distribution. Other examples of distributed datastores include eventual consistency systems, mainly implemented as key value stores or NewSQL DBs. In other settings, custom distributed databases and datastores have been built by telecommunication and cloud service providers to handle the most common key performance indicators (KPIs) that are relevant to the particular service or service objective.

Within each of these existing distributed data systems, the need for concurrency control is often met at the expense of performance or complexity. None of the above data systems are optimized to large scale distribution and decentralization at the edge (or outside of large data centers), due to partial trust issues and the intersection of many security/privacy domains and constraints that must be verified before updating decentralized and distributed/replicated data. These data systems are further resource (power, bandwidth, compute cycles) intensive, and are often driven to achieve high throughput regardless of the tight and deterministic latency requirements that apply at the edge.

The following examples discuss techniques for generating and verifying timestamps which can securely, reliably, and quickly achieve efficient coordination across many different caches of information that involve distributed transactions. Such coordination enables the reliable use of MVCC data systems or blockchains in edge computing scenarios. Use of time-based MVCC is particularly attractive for use in edge computing scenarios due to wide distribution of edge transactions, which prevents many deployments of traditional, tightly coupled or exclusion-control based synchronization or consistency management systems.

With the use of secure high precision (small granularity) clocks, generated in the manner discussed in more detail below, a MVCC database can employ coordinated time as a monotonically increasing version number, and achieve high precision time-based versioning for distributed edge transactions. Additionally, the use of high precision clocks also may provide benefits for certain blockchain transactions, or other distributed ledger transactions employed in edge computing (or other distributed compute settings) which involve the use and verification of timestamp values from among multiple computing entities.

The following examples specifically enable concurrency control, with the use of time-based coordination provided through a secure generation and verification of timestamps. The advantages of the timing approaches include the following: enabling low overhead MVCC or blockchain transactions in the edge; eliminating explicit locks on shared records by using temporal fences/timestamps; enabling lower power and latency for computation and verification; and introducing improved trust, through an additional level of guarantee, such as a hardware-based security that is backed by the credibility of the hardware manufacturer. Further, these approaches may be provided with less software complexity, because software that runs within a single administrative or ownership domain (such as in a data center cloud, or at a central office) can use hardware-based trusted timestamps and hardware assisted/hardware-based validation of timestamps. Additionally, verification of timing information does not have to be run with extra libraries that perform validation in software. Even software in a single ownership domain may be assisted by these capabilities because it becomes possible for transactional applications to migrate between edge (middle tier) and data center cloud (backend tier) as needed.

As further detailed in the examples below, these and other timestamp uses and configurations may be applied within a variety of hardware configurations in an edge computing architecture. Further overviews of edge computing and workload types are discussed within the following examples.

Example Edge Computing Architectures

FIG. 1 is a block diagram 100 showing an overview of a configuration for edge computing, which includes a layer of processing referenced in many of the current examples as an "edge cloud". This network topology, which may include a number of conventional networking layers (including those not shown herein), may be extended through use of the secure memory management techniques and the compute and network configurations discussed herein.

As shown, the edge cloud 110 is co-located at an edge location, such as the base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer end point devices than at a base station or at a central office). However, the closer that the edge location is to the endpoint (e.g., UEs), the more that space and power is constrained. Thus, edge computing, as a general design principle, attempts to minimize the amount of resources needed for network services, through the distribution of more resources which are located closer both geographically and in network access time.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance); configurations based on the type of compute, memory, storage, fabric, acceleration, or like resources available to edge locations, tiers of locations, or groups of locations; the service, security, and management and orchestration capabilities; and related objectives to achieve usability and performance of end services.

Edge computing is a developing paradigm where computing is performed at or closer to the "edge" of a network, typically through the use of a compute platform implemented at base stations, gateways, network routers, or other devices which are much closer to end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with compute hardware that performs virtualized network functions and offers compute resources for the execution of services and consumer functions for connected devices. These and other scenarios may be enhanced with the use of secure timestamp generation and verification, as provided in the discussion below.

In contrast to the network architecture of FIG. 1, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage, but is not optimal for highly time varying data, such as a collision, traffic light change, etc. and may fail in attempting to meet latency challenges.

Depending on the real-time requirements in a communications context, a hierarchical structure of data processing and storage nodes may be defined in an edge computing deployment. For example, such a deployment may include local ultra-low-latency processing, regional storage and processing as well as remote cloud data-center based storage and processing. Key performance indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center.

Figure 2:
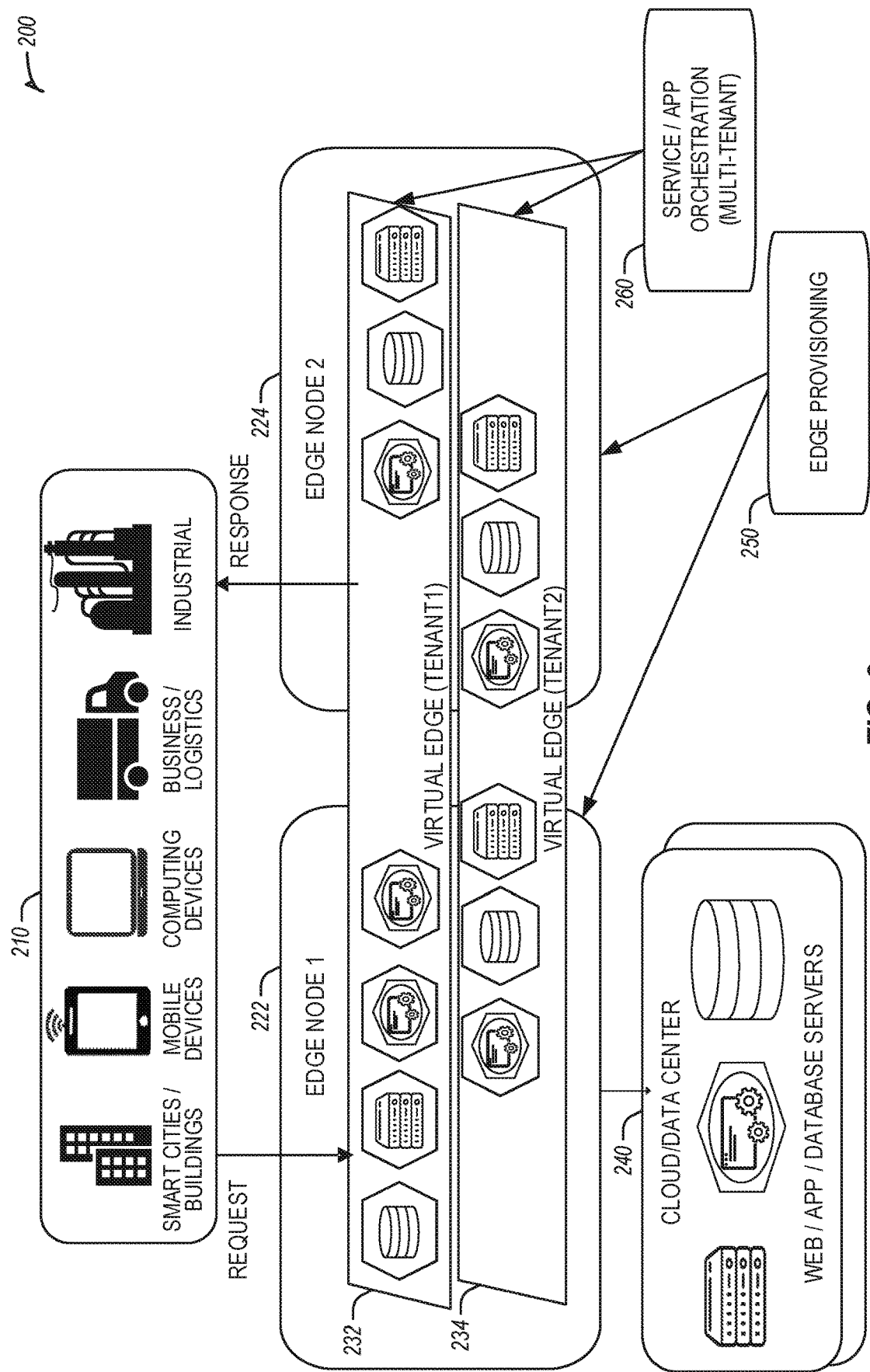
FIG. 2 illustrates deployment and orchestration for virtual edge configurations across an edge computing system operated among multiple edge nodes and multiple tenants, according to an example.

FIG. 2 illustrates deployment and orchestration for virtual edge configurations across an edge computing system operated among multiple edge nodes and multiple tenants. Specifically, FIG. 2 depicts coordination of a first edge node 222 and a second edge node 224 in an edge computing system 200, to fulfill requests and responses for various client endpoints 210 from various virtual edge instances. The virtual edge instances provide edge compute capabilities and processing in an edge cloud, with access to a cloud/data center 240 for higher-latency requests for websites, applications, database servers, etc. Thus, the edge cloud enables coordination of processing among multiple edge nodes for multiple tenants or entities.

In the example of FIG. 2, these virtual edge instances include: a first virtual edge 232, offered to a first tenant (Tenant 1), which offers a first combination of edge storage, computing, and services; and a second virtual edge 234, offering a second combination of edge storage, computing, and services, to a second tenant (Tenant 2). The virtual edge instances 232, 234 are distributed among the edge nodes 222, 224, and may include scenarios in which a request and response are fulfilled from the same or different edge nodes. The configuration of each edge node 222, 224 to operate in a distributed yet coordinated fashion occurs based on edge provisioning functions 250. The functionality of the edge nodes 222, 224 to provide coordinated operation for applications and services, among multiple tenants, occurs based on orchestration functions 260.

It should be understood that some of the devices in 210 are multi-tenant devices where Tenant1 may function within a Tenant1 'slice' while a Tenant2 may function within a Tenant2 slice. A trusted multi-tenant device may further contain a tenant specific cryptographic key such that the combination of key and slice may be considered a "root of trust" (RoT) or tenant-specific RoT. A RoT may further be computed dynamically composed using a security architecture, such as a DICE (Device Identity Composition Engine) architecture where a DICE hardware building block is used to construct layered trusted computing base contexts for layering of device capabilities (such as a Field Programmable Gate Array (FPGA)). The RoT also may be used for a trusted computing context to support respective tenant operations, etc.

Edge computing nodes may partition resources (memory, CPU, GPU, interrupt controller, I/O controller, memory controller, bus controller, etc.) where each partition may contain a RoT capability and where fan-out and layering according to a DICE model may further be applied to edge nodes. Cloud computing nodes consisting of containers, FaaS (function as a service) engines, servlets, servers, or other computation abstraction may be partitioned according to a DICE layering and fan-out structure to support a RoT context for each. Accordingly, the respective RoTs spanning entities 210, 222, and 240 may coordinate the establishment of a distributed trusted computing base (DTCB) such that a tenant-specific virtual trusted secure channel linking all elements end-to-end can be established.

Additionally, the edge computing system may be extended to provide orchestration of multiple applications through the use of containers (a contained, deployable unit of software that provides code and needed dependencies), in a multi-owner, multi-tenant environment. A multi-tenant orchestrator may be used to perform key management, trust anchor management, and other security functions related to the provisioning and lifecycle of the trusted 'slice' concept in FIG. 2. An orchestrator may use a DICE layering and fan-out construction to create a RoT context that is tenant-specific. Thus, orchestration functions, provided by an orchestrator, may participate as a tenant-specific orchestration provider.

Accordingly, an edge computing system may be configured to fulfill requests and responses for various client endpoints from multiple virtual edge instances (and, from a cloud or remote data center, not shown). The use of these virtual edge instances supports multiple tenants and multiple applications (e.g., AR/VR, enterprise applications, content delivery, gaming, compute offload) simultaneously. Further, there may be multiple types of applications within the virtual edge instances (e.g., normal applications, latency sensitive applications, latency critical applications, user plane applications, networking applications, etc.). The virtual edge instances may also be spanned across systems of multiple owners at different geographic locations.

In further examples, edge computing systems may deploy containers in an edge computing system. As a simplified example, a container manager is adapted to launch containerized pods, functions, and functions-as-a-service instances through execution via compute nodes, or to separately execute containerized virtualized network functions through execution via compute nodes. This arrangement may be adapted for use by multiple tenants in system arrangement, where containerized pods, functions, and functions-as-a-service instances are launched within virtual machines specific to each tenant (aside the execution of virtualized network functions).

Within the edge cloud, a first edge node 222 (e.g., operated by a first owner) and a second edge node 224 (e.g., operated by a second owner) may operate or respond to a container orchestrator to coordinate the execution of various applications within the virtual edge instances offered for respective tenants. For instance, the edge nodes 222, 224 may be coordinated based on edge provisioning functions 250, while the operation of the various applications are coordinated with orchestration functions 260.

Various system arrangements may provide an architecture that treats VMs, Containers, and Functions equally in terms of application composition (and resulting applications are combinations of these three ingredients). Each ingredient may involve use of one or more accelerator (e.g., FPGA, ASIC) components as a local backend. In this manner, applications can be split across multiple edge owners, coordinated by an orchestrator.

Figure 3:
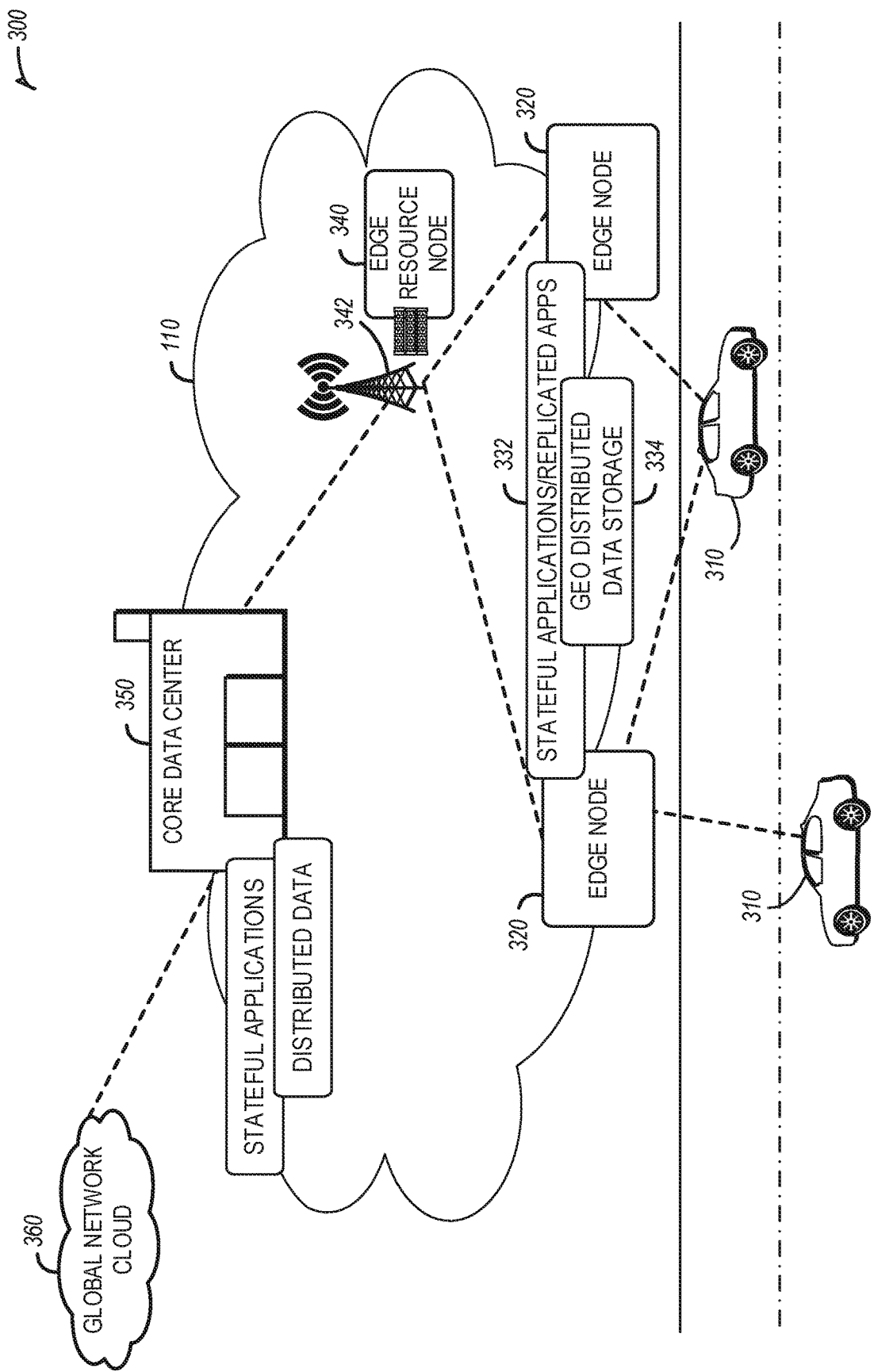
FIG. 3 illustrates a vehicle compute and communication use case involving mobile access to applications in an edge computing system, according to an example.

It should be appreciated that the edge computing systems and arrangements discussed herein may be applicable in various solutions, services, and/or use cases. As an example, FIG. 3 shows a simplified vehicle compute and communication use case involving mobile access to applications in an edge computing system 300 that implements an edge cloud 110. In this use case, each client compute node 310 may be embodied as in-vehicle compute systems (e.g., in-vehicle navigation and/or infotainment systems) located in corresponding vehicles that communicate with the edge gateway nodes 320 during traversal of a roadway. For instance, edge gateway nodes 320 may be located in roadside cabinets, which may be placed along the roadway, at intersections of the roadway, or other locations near the roadway. As each vehicle traverses along the roadway, the connection between its client compute node 310 and a particular edge gateway node 320 may propagate so as to maintain a consistent connection and context for the client compute node 310. Each of the edge gateway nodes 320 includes some processing and storage capabilities and, as such, some processing and/or storage of data for the client compute nodes 310 may be performed on one or more of the edge gateway nodes 320.

Each of the edge gateway nodes 320 may communicate with one or more edge resource nodes 340, which are illustratively embodied as compute servers, appliances or components located at or in a communication base station 342 (e.g., a base station of a cellular network). As discussed above, each edge resource node 340 includes some processing and storage capabilities and, as such, some processing and/or storage of data for the client compute nodes 310 may be performed on the edge resource node 340. For example, the processing of data that is less urgent or important may be performed by the edge resource node 340, while the processing of data that is of a higher urgency or importance may be performed by the edge gateway devices or the client nodes themselves (depending on, for example, the capabilities of each component). Further, various wired or wireless communication links (e.g., fiber optic wired backhaul, 5G wireless links) may exist among the edge nodes 320, edge resource node(s) 340, core data center 350, and network cloud 360.

The edge resource node(s) 340 also communicate with the core data center 350, which may include compute servers, appliances, and/or other components located in a central location (e.g., a central office of a cellular communication network). The core data center 350 may provide a gateway to the global network cloud 360 (e.g., the Internet) for the edge cloud 110 operations formed by the edge resource node(s) 340 and the edge gateway nodes 320. Additionally, in some examples, the core data center 350 may include an amount of processing and storage capabilities and, as such, some processing and/or storage of data for the client compute devices may be performed on the core data center 350 (e.g., processing of low urgency or importance, or high complexity). The edge gateway nodes 320 or the edge resource nodes 340 may offer the use of stateful applications 332 and a geographic distributed data storage 334 (e.g., database, data store, etc.).

In further examples, FIG. 3 may utilize various types of mobile edge nodes, such as an edge node hosted in a vehicle (e.g., car, truck, tram, train, etc.) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in a variety of settings, including coordination between some functions or operations at individual endpoint devices or the edge gateway nodes 320, some others at the edge resource node 340, and others in the core data center 350 or global network cloud 360.

In further configurations, the edge computing system may implement FaaS or EaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS or EaaS deployment, a container is used to provide an environment in which function code is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, the container is "spun down" (e.g., deactivated and/or deallocated) on the infrastructure in response to the execution being completed.

Further aspects of FaaS and EaaS may enable deployment of edge functions in a service fashion, including a support of respective functions that support edge computing as a service. Additional features of FaaS and EaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require deployment or configuration).

Some of the techniques and configurations discussed with reference to edge computing may be implemented within a MEC environment, such as the provided by the standards and approaches published in ETSI GS MEC-003 "Mobile Edge Computing (MEC); Framework and Reference Architecture" (e.g., V2.0.3) and related MEC or networked operational implementations. While the presently discussed forms of timestamp generation and verification techniques may provide significant benefits to MEC architectures and system deployments, the applicability of the present techniques and configurations may be extended to any number of edge computing, IoT, fog, or distributed computing platforms.

MEC is intended to support developing mobile use cases of edge computing, to allow application developers and content providers to access computing capabilities and an IT service environment in dynamic settings at the edge of the network. MEC offers application developers and content providers cloud-computing capabilities and an IT service environment using equipment located closer to network (e.g., cellular network) edges. This environment is characterized by ultra-low latency and high bandwidth as well as real-time access to radio network information that may be leveraged by applications. MEC technology permits operators to flexibly and rapidly deploy innovative applications and services towards mobile subscribers, enterprises and vertical segments.

MEC, like other edge computing deployments, may reduce network congestion by operating applications, data functions, and discovery, etc. closer to the user (e.g., mobile device, user equipment (UE), station (STA), etc.). Some MEC details dealing with security (e.g., both user security as well as application integrity), radio use, etc., have been promulgated by European Telecommunications Standards Institute (ETSI), such as described in the "Mobile Edge Computing Introductory Technical White Paper," published Sep. 1, 2014. A set of specifications and white papers providing further details and implementation use cases for MEC scenarios is being developed and published on an ongoing basis by ETSI as part of the ETSI MEC industry specification group (ISG).

MEC architectures offers application developers and content providers cloud-computing capabilities and an IT service environment at the edge of the network. This environment is characterized by ultra-low latency and high bandwidth as well as real-time access to radio network information that can be leveraged by applications. MEC technology thus permits flexible and rapid deployment of innovative applications and services towards mobile subscribers, enterprises and vertical segments. For instance, in automotive settings, applications such as V2X (vehicle-to-everything, IEEE 802.11p based or 3GPP LTE-V2X based) may use MEC technology to exchange data, provide data to aggregation points, and access data in databases to provide and obtain an overview of the local situation derived from a multitude of sensors (by various cars, roadside units, etc.).

Figure 4:
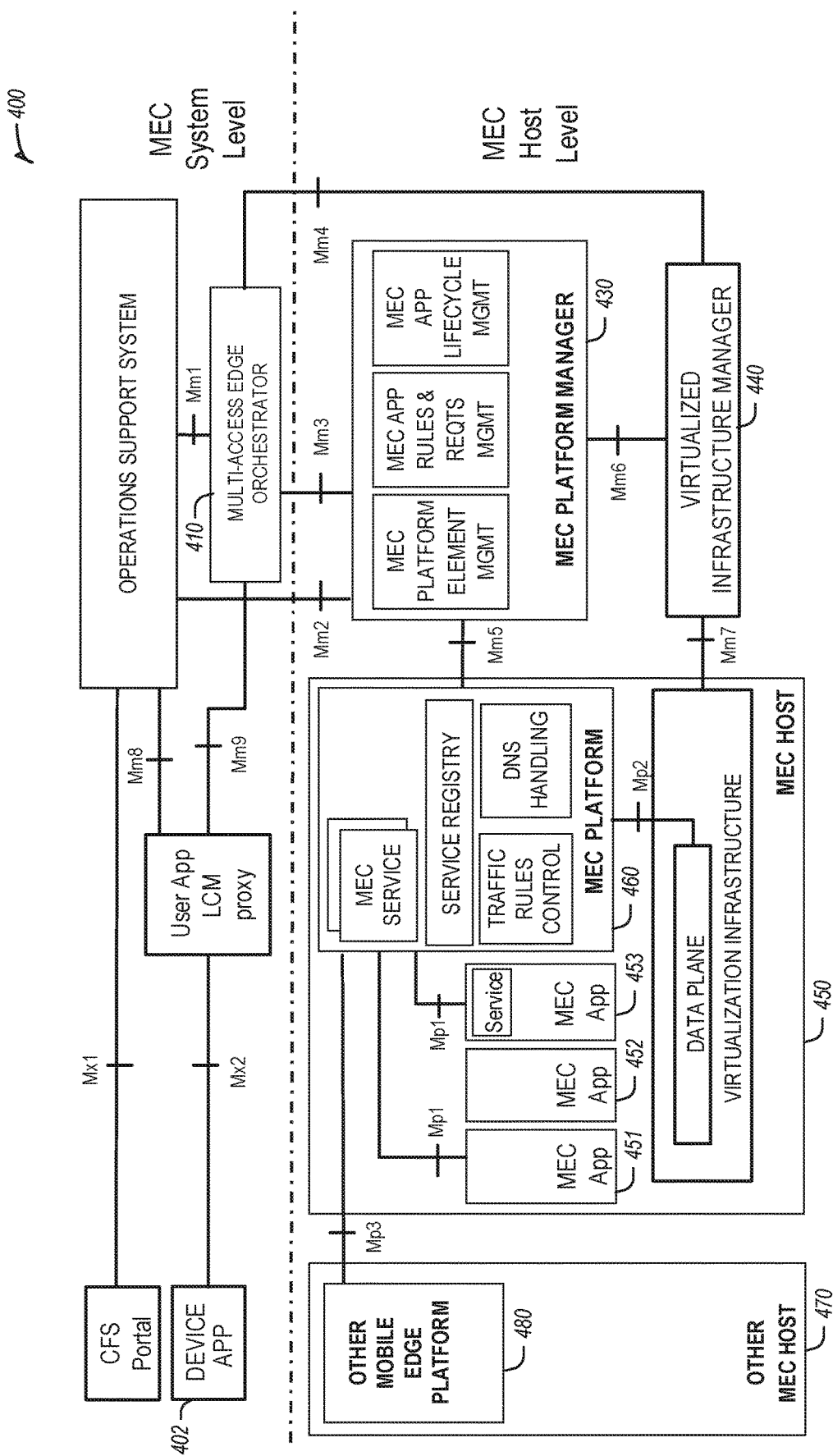
FIG. 4 illustrates a block diagram for a Multi-access Edge Computing (MEC) system architecture, according to an example.

FIG. 4 depicts a block diagram 400 for an example Multi-access Edge Computing (MEC) system architecture. In an example, the MEC system architecture may be defined according to a specification, standard, or other definition (e.g., according to the ETSI ISG MEC-003 specification). In this diagram, Mp reference points refer to MEC platform functionality; Mm reference points refer to management; and Mx refers to connections to external entities. The services, applications, orchestrators, and other entities discussed herein may be implemented at any number of the entities of the MEC system architecture depicted in FIG. 4, and the communications to perform network operations may be implemented at any number of the interfaces of the MEC system architecture depicted in FIG. 4.

For instance, a device application 402 operating at a client user equipment device (e.g., smartphone) may access a multi-access edge orchestrator 410, as the orchestrator 410 coordinates system configuration or features of an edge computing host for fulfillment of services or applications. Further, a particular MEC Host 450 may operate one or more MEC applications 451, 452, 453 or a platform 460 which provide a MEC resource or service via a virtual edge appliance, as further detailed in FIGS. 7 and 9. A virtualized infrastructure manager 440 and MEC Platform Manager 430 provide management of the use of the hosts, platforms, and resources, and may also provide managed access to an attestation service or verifier (not shown). The virtualized infrastructure manager 440 and MEC Platform Manager 430 may also provide managed access to other MEC hosts (e.g., host 470) or MEC platforms (e.g., platform 480), which may also be involved with uses of attestation functionality as described herein.

Example Computing Devices

Figure 5:
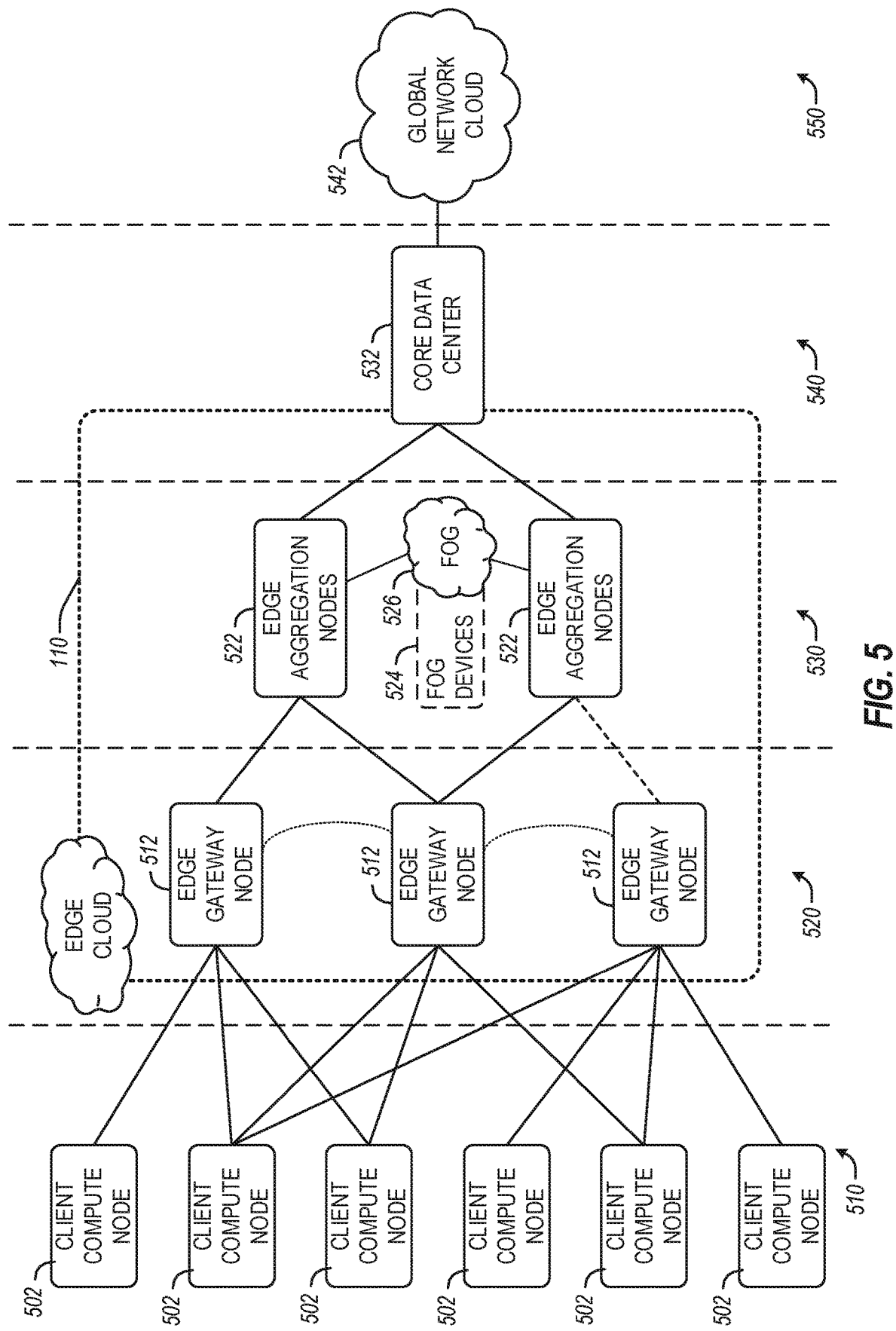
FIG. 5 illustrates an overview of layers of distributed compute deployed among an edge computing environment, according to an example.

At a more generic level, an edge computing system may be described to encompass any number of deployments operating in the edge cloud 110, which provide coordination from client and distributed computing devices. FIG. 5 provides a further abstracted overview of layers of distributed compute deployed among an edge computing environment for purposes of illustration.

FIG. 5 generically depicts an edge computing system for providing edge services and applications to multi-stakeholder entities, as distributed among one or more client compute nodes 502, one or more edge gateway nodes 512, one or more edge aggregation nodes 522, one or more core data centers 532, and a global network cloud 542, as distributed across layers of the network. The implementation of the edge computing system may be provided at or on behalf of a telecommunication service provider ("telco", or "TSP"), internet-of-things service provider, cloud service provider (CSP), enterprise entity, or any other number of entities. Various forms of wired or wireless connections may be configured to establish connectivity among the nodes 502, 512, 522, 532, including interconnections among such nodes (e.g., connections among edge gateway nodes 512, and connections among edge aggregation nodes 522).

Each node or device of the edge computing system is located at a particular layer corresponding to layers 510, 520, 530, 540, 550. For example, the client compute nodes 502 are each located at an endpoint layer 510, while each of the edge gateway nodes 512 are located at an edge devices layer 520 (local level) of the edge computing system. Additionally, each of the edge aggregation nodes 522 (and/or fog devices 524, if arranged or operated with or among a fog networking configuration 526) are located at a network access layer 530 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein are applicable to fog networks, fogging, and fog configurations. Further, aspects of the edge computing systems discussed herein may be configured as a fog, or aspects of a fog may be integrated into an edge computing architecture.

The core data center 532 is located at a core network layer 540 (e.g., a regional or geographically-central level), while the global network cloud 542 is located at a cloud data center layer 550 (e.g., a national or global layer). The use of "core" is provided as a term for a centralized network location—deeper in the network—which is accessible by multiple edge nodes or components; however, a "core" does not necessarily designate the "center" or the deepest location of the network. Accordingly, the core data center 532 may be located within, at, or near the edge cloud 110.

Although an illustrative number of client compute nodes 502, edge gateway nodes 512, edge aggregation nodes 522, core data centers 532, global network clouds 542 are shown in FIG. 5, it should be appreciated that the edge computing system may include more or fewer devices or systems at each layer. Additionally, as shown in FIG. 5, the number of components of each layer 510, 520, 530, 540, 550 generally increases at each lower level (i.e., when moving closer to endpoints). As such, one edge gateway node 512 may service multiple client compute nodes 502, and one edge aggregation node 522 may service multiple edge gateway nodes 512.

Consistent with the examples provided herein, each client compute node 502 may be embodied as any type of end point component, device, appliance, or "thing" capable of communicating as a producer or consumer of data. Further, the label "node" or "device" as used in the edge computing system 500 does not necessarily mean that such node or device operates in a client or slave role; rather, any of the nodes or devices in the edge computing system 500 refer to individual entities, nodes, or subsystems which include discrete or connected hardware or software configurations to facilitate or use the edge cloud 110.

As such, the edge cloud 110 is formed from network components and functional features operated by and within the edge gateway nodes 512 and the edge aggregation nodes 522 of layers 520, 530, respectively. The edge cloud 110 may be embodied as any type of network that provides edge computing and/or storage resources which are proximately located to radio access network (RAN) capable endpoint devices (e.g., mobile computing devices, IoT devices, smart devices, etc.), which are shown in FIG. 5 as the client compute nodes 502. In other words, the edge cloud 110 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 110 may form a portion of or otherwise provide an ingress point into or across a fog networking configuration 526 (e.g., a network of fog devices 524, not shown in detail), which may be embodied as a system-level horizontal and distributed architecture that distributes resources and services to perform a specific function. For instance, a coordinated and distributed network of fog devices 524 may perform computing, storage, control, or networking aspects in the context of an IoT system arrangement. Other networked, aggregated, and distributed functions may exist in the edge cloud 110 between the core network layer 540 and the client endpoints (e.g., client compute nodes 502). Some of these are discussed in the following sections in the context of network functions or service virtualization, including the use of virtual edges and virtual services which are orchestrated for multiple stakeholders.

The edge gateway nodes 512 and the edge aggregation nodes 522 cooperate to provide various edge services and security to the client compute nodes 502. Furthermore, because each client compute node 502 may be stationary or mobile, each edge gateway node 512 may cooperate with other edge gateway devices to propagate presently provided edge services and security as the corresponding client compute node 502 moves about a region. To do so, each of the edge gateway nodes 512 and/or edge aggregation nodes 522 may support multiple tenancy and multiple stakeholder configurations, in which services from (or hosted for) multiple service providers and multiple consumers may be supported and coordinated across a single or multiple compute devices.

In various examples, the timestamp generation and verification operations may be implemented among the client compute nodes 502, at the edge gateway nodes 512 or aggregation nodes 522, and other intermediate nodes in the edge cloud 110, which operate or utilize timestamps as part of service, acceleration, compute, storage, or memory functions, as further discussed below with reference to FIGS. 7 to 12.

In further examples, any of the compute nodes or devices discussed with reference to the present edge computing systems and environment may be fulfilled based on the components depicted in FIGS. 6A and 6B. Each edge compute node may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

Figure 6A:
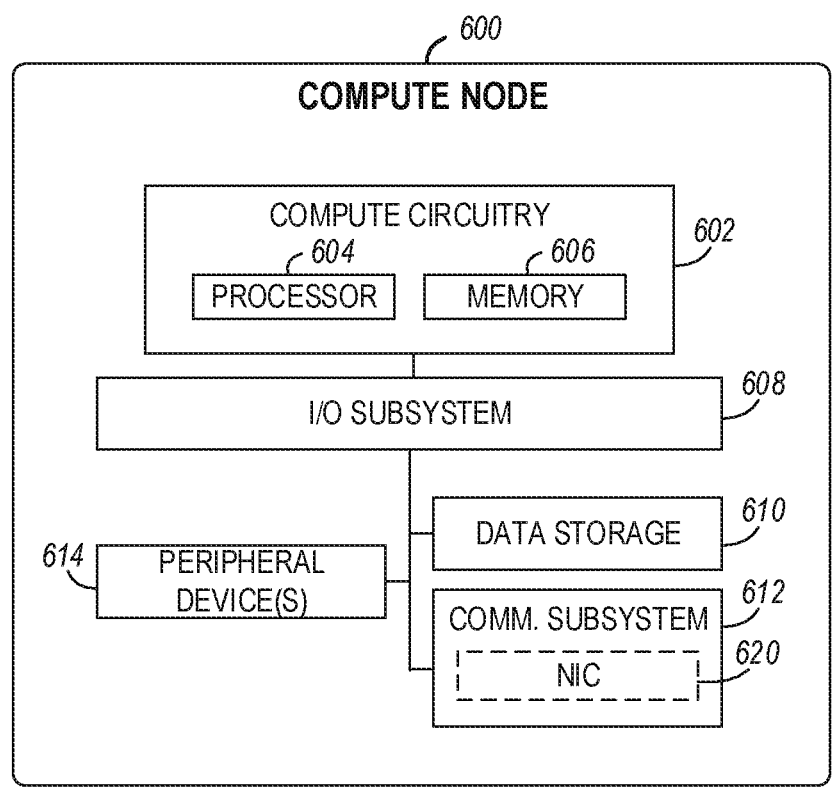
FIG. 6A illustrates an overview of example components deployed at a compute node system, according to an example.

In the simplified example depicted in FIG. 6A, an edge compute node 600 includes a compute engine (also referred to herein as "compute circuitry") 602, an input/output (I/O) subsystem 608, data storage 610, a communication circuitry subsystem 612, and, optionally, one or more peripheral devices 614. In other examples, each compute device may include other or additional components, such as those used in personal or server computing systems (e.g., a display, peripheral devices, etc.). Additionally, in some examples, one or more of the illustrative components may be incorporated in, or otherwise form a portion of, another component.

The compute node 600 may be embodied as any type of engine, device, or collection of devices capable of performing various compute functions. In some examples, the compute node 600 may be embodied as a single device such as an integrated circuit, an embedded system, a field-programmable gate array (FPGA), a system-on-a-chip (SOC), or other integrated system or device. In the illustrative example, the compute node 600 includes or is embodied as a processor 604 and a memory 606. The processor 604 may be embodied as any type of processor capable of performing the functions described herein (e.g., executing an application). For example, the processor 604 may be embodied as a multi-core processor(s), a microcontroller, or other processor or processing/controlling circuit. In some examples, the processor 604 may be embodied as, include, or be coupled to an FPGA, an application specific integrated circuit (ASIC), reconfigurable hardware or hardware circuitry, or other specialized hardware to facilitate performance of the functions described herein.

The main memory 606 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three-dimensional crosspoint memory device (e.g., Intel 3D XPoint™ memory), or other byte addressable write-in-place nonvolatile memory devices. The memory device may refer to the die itself and/or to a packaged memory product. In some examples, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 606 may be integrated into the processor 604. The main memory 606 may store various software and data used during operation such as one or more applications, data operated on by the application(s), libraries, and drivers.

The compute circuitry 602 is communicatively coupled to other components of the compute node 600 via the I/O subsystem 608, which may be embodied as circuitry and/or components to facilitate input/output operations with the compute circuitry 602 (e.g., with the processor 604 and/or the main memory 606) and other components of the compute circuitry 602. For example, the I/O subsystem 608 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 608 may form a portion of a system-on-a-chip (SoC) and be incorporated, along with one or more of the processor 604, the main memory 606, and other components of the compute circuitry 602, into the compute circuitry 602.

The one or more illustrative data storage devices 610 may be embodied as any type of devices configured for short-term or long-term storage of data such as, for example, memory devices and circuits, memory cards, hard disk drives, solid-state drives, or other data storage devices. Each data storage device 610 may include a system partition that stores data and firmware code for the data storage device 610. Each data storage device 610 may also include one or more operating system partitions that store data files and executables for operating systems depending on, for example, the type of compute node 600.

The communication circuitry 612 may be embodied as any communication circuit, device, or collection thereof, capable of enabling communications over a network between the compute circuitry 602 and another compute device (e.g., an edge gateway node 512 of the edge computing system 500). The communication circuitry 612 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, etc.) to effect such communication.

The illustrative communication circuitry 612 includes a network interface controller (NIC) 620, which may also be referred to as a host fabric interface (HFI). The NIC 620 may be embodied as one or more add-in-boards, daughter cards, network interface cards, controller chips, chipsets, or other devices that may be used by the compute node 600 to connect with another compute device (e.g., an edge gateway node 512). In some examples, the NIC 620 may be embodied as part of a system-on-a-chip (SoC) that includes one or more processors, or included on a multichip package that also contains one or more processors. In some examples, the NIC 620 may include a local processor (not shown) and/or a local memory (not shown) that are both local to the NIC 620. In such examples, the local processor of the NIC 620 may be capable of performing one or more of the functions of the compute circuitry 602 described herein. Additionally or alternatively, in such examples, the local memory of the NIC 620 may be integrated into one or more components of the client compute node at the board level, socket level, chip level, and/or other levels.

Additionally, in some examples, each compute node 600 may include one or more peripheral devices 614. Such peripheral devices 614 may include any type of peripheral device found in a compute device or server such as audio input devices, a display, other input/output devices, interface devices, and/or other peripheral devices, depending on the particular type of the compute node 600. In further examples, the compute node 600 may be embodied by a respective edge compute node in an edge computing system (e.g., client compute node 502, edge gateway node 512, edge aggregation node 522) or like forms of appliances, computers, subsystems, circuitry, or other components.

Figure 6B:
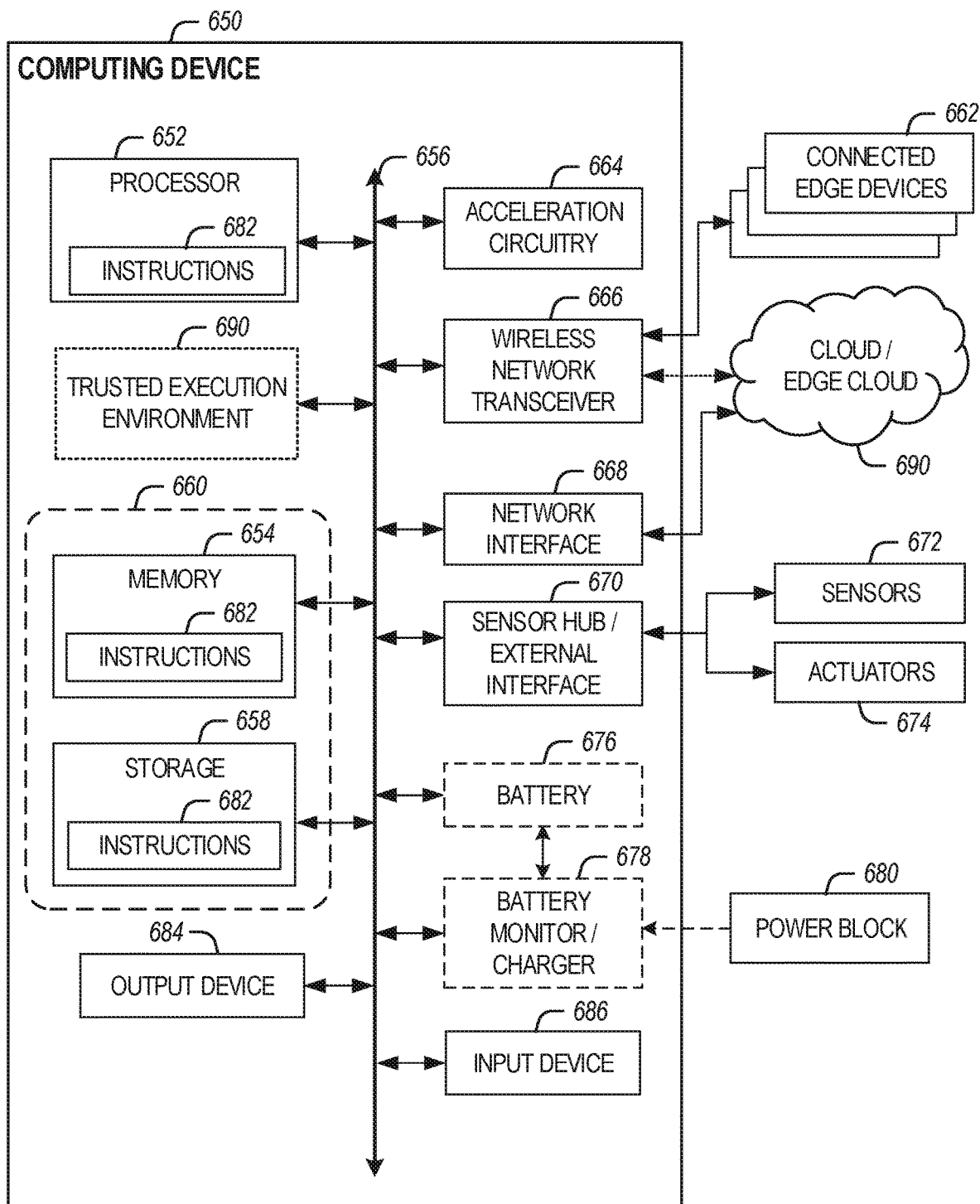
FIG. 6B illustrates a further overview of example components within a computing device, according to an example.

In a more detailed example, FIG. 6B illustrates a block diagram of an example of components that may be present in an edge computing node 650 for implementing the techniques (e.g., operations, processes, methods, and methodologies) described herein. The edge computing node 650 may include any combinations of the components referenced above, and it may include any device usable with an edge communication network or a combination of such networks. The components may be implemented as ICs, portions thereof, discrete electronic devices, or other modules, logic, hardware, software, firmware, or a combination thereof adapted in the edge computing node 650, or as components otherwise incorporated within a chassis of a larger system.

The edge computing node 650 may include processing circuitry in the form of a processor 652, which may be a microprocessor, a multi-core processor, a multithreaded processor, an ultra-low voltage processor, an embedded processor, or other known processing elements. The processor 652 may be a part of a system on a chip (SoC) in which the processor 652 and other components are formed into a single integrated circuit, or a single package, such as the Edison™ or Galileo™ SoC boards from Intel Corporation, Santa Clara, Calif. As an example, the processor 652 may include an Intel® Architecture Core™ based processor, such as a Quark™, a Xeon™, an Atom™, an i3, an i5, an i7, an i9, or an MCU-class processor, or another such processor available from Intel®. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or a customer thereof, or their licensees or adopters. The processors may include units such as an A5-A12 processor from Apple® Inc., a Snapdragon™ processor from Qualcomm® Technologies, Inc., or an OMAP™ processor from Texas Instruments, Inc.

The processor 652 may communicate with a system memory 654 over an interconnect 656 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 658 may also couple to the processor 652 via the interconnect 656. In an example, the storage 658 may be implemented via a solid-state disk drive (SSDD). Other devices that may be used for the storage 658 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magneto-resistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 658 may be on-die memory or registers associated with the processor 652. However, in some examples, the storage 658 may be implemented using a micro hard disk drive (HDD). Further, any number of new technologies may be used for the storage 658 in addition to, or instead of, the technologies described, such resistance change memories, phase change memories, holographic memories, or chemical memories, among others.

The components may communicate over the interconnect 656. The interconnect 656 may include any number of technologies, including industry standard architecture (ISA), extended ISA (EISA), peripheral component interconnect (PCI), peripheral component interconnect extended (PCIx), PCI express (PCIe), or any number of other technologies. The interconnect 656 may be a proprietary bus, for example, used in an SoC based system. Other bus systems may be included, such as an I2C interface, an SPI interface, point to point interfaces, and a power bus, among others.

The interconnect 656 may couple the processor 652 to a transceiver 666, for communications with the connected edge devices 662. The transceiver 666 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 662. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 666 (or multiple transceivers) may communicate using multiple standards or radios for communications at a different range. For example, the edge computing node 650 may communicate with close devices, e.g., within about 10 meters, using a local transceiver based on BLE, or another low power radio, to save power. More distant connected edge devices 662, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee.

A wireless network transceiver 666 (e.g., a radio transceiver) may be included to communicate with devices or services in the edge cloud 690 via local or wide area network protocols. The wireless network transceiver 666 may be an LPWA transceiver that follows the IEEE 802.15.4, or IEEE 802.15.4g standards, among others. The edge computing node 650 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 666, as described herein. For example, the transceiver 666 may include a cellular transceiver that uses spread spectrum (SPA/SAS) communications for implementing high-speed communications. Further, any number of other protocols may be used, such as Wi-Fi® networks for medium speed communications and provision of network communications. The transceiver 666 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 668 may be included to provide a wired communication to nodes of the edge cloud 690 or to other devices, such as the connected edge devices 662 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 668 may be included to enable connecting to a second network, for example, a first NIC 668 providing communications to the cloud over Ethernet, and a second NIC 668 providing communications to other devices over another type of network. The NIC 668 may further implement a subset of the IEEE 802.1 TSN (time-sensitive networking) standards, or IEEE standard 1588 (PTP), the Network Time Protocol (NTP), or like standards to enable time coordination and determination, consistent with the techniques discussed herein.

Given the variety of types of applicable communications from the device to another component or network, applicable communications circuitry used by the device may include or be embodied by any one or more of components 664, 666, 668, or 670. Accordingly, in various examples, applicable means for communicating (e.g., receiving, transmitting, etc.) may be embodied by such communications circuitry.

The edge computing node 650 may include or be coupled to acceleration circuitry 664, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 656 may couple the processor 652 to a sensor hub or external interface 670 that is used to connect additional devices or subsystems. The devices may include sensors 672, such as accelerometers, level sensors, flow sensors, optical light sensors, camera sensors, temperature sensors, a global positioning system (GPS) sensors, pressure sensors, barometric pressure sensors, and the like. The hub or interface 670 further may be used to connect the edge computing node 650 to actuators 674, such as power switches, valve actuators, an audible sound generator, a visual warning device, and the like.

In some optional examples, various input/output (I/O) devices may be present within or connected to, the edge computing node 650. For example, a display or other output device 684 may be included to show information, such as sensor readings or actuator position. An input device 686, such as a touch screen or keypad may be included to accept input. An output device 684 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 650.

A battery 676 may power the edge computing node 650, although, in examples in which the edge computing node 650 is mounted in a fixed location, it may have a power supply coupled to an electrical grid. The battery 676 may be a lithium ion battery, or a metal-air battery, such as a zinc-air battery, an aluminum-air battery, a lithium-air battery, and the like.

A battery monitor/charger 678 may be included in the edge computing node 650 to track the state of charge (SoCh) of the battery 676. The battery monitor/charger 678 may be used to monitor other parameters of the battery 676 to provide failure predictions, such as the state of health (SoH) and the state of function (SoF) of the battery 676. The battery monitor/charger 678 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 678 may communicate the information on the battery 676 to the processor 652 over the interconnect 656. The battery monitor/charger 678 may also include an analog-to-digital (ADC) converter that enables the processor 652 to directly monitor the voltage of the battery 676 or the current flow from the battery 676. The battery parameters may be used to determine actions that the edge computing node 650 may perform, such as transmission frequency, mesh network operation, sensing frequency, and the like.

A power block 680, or other power supply coupled to a grid, may be coupled with the battery monitor/charger 678 to charge the battery 676. In some examples, the power block 680 may be replaced with a wireless power receiver to obtain the power wirelessly, for example, through a loop antenna in the edge computing node 650. A wireless battery charging circuit, such as an LTC4020 chip from Linear Technologies of Milpitas, Calif., among others, may be included in the battery monitor/charger 678. The specific charging circuits may be selected based on the size of the battery 676, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 658 may include instructions 682 in the form of software, firmware, or hardware commands to implement the techniques described herein. Although such instructions 682 are shown as code blocks included in the memory 654 and the storage 658, it may be understood that any of the code blocks may be replaced with hardwired circuits, for example, built into an application specific integrated circuit (ASIC).

In an example, the instructions 682 provided via the memory 654, the storage 658, or the processor 652 may be embodied as a non-transitory, machine-readable medium 660 including code to direct the processor 652 to perform electronic operations in the edge computing node 650. The processor 652 may access the non-transitory, machine-readable medium 660 over the interconnect 656. For instance, the non-transitory, machine-readable medium 660 may be embodied by devices described for the storage 658 or may include specific storage units such as optical disks, flash drives, or any number of other hardware devices. The non-transitory, machine-readable medium 660 may include instructions to direct the processor 652 to perform a specific sequence or flow of actions, for example, as described with respect to the flowchart(s) and block diagram(s) of operations and functionality depicted above. As used in, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Each of the block diagrams of FIGS. 6A and 6B are intended to depict a high-level view of components of a device, subsystem, or arrangement of an edge computing node. However, it will be understood that some of the components shown may be omitted, additional components may be present, and a different arrangement of the components shown may occur in other implementations.

Distributed Edge Computing Transactions

As suggested above, transactions that occur in edge computing settings often are accomplished in a distributed manner among multiple entities (devices, nodes, platforms, etc.). In this distributed arrangement, the distributed state or information for computation is often shared and dynamically accessed and modified among many entities. These entities may belong to or operate under the control of different parties, operators, tenants, etc.

One way in which edge computing transactions may be coordinated in an EaaS or FaaS setting, is with the use of distributed immutable ledger. Transactions produce changes in information, and the changes need to be transparent and verifiable to protect the interests of transacting parties. The parties may trust each other yet that trust may only be provided up to a certain extent, and with the trust to be guaranteed by an immutable audit trail. Such an audit trail, when incorporated into a blockchain implementation, enables multiparty trust without the cost, delays, and inflexibilities of requiring a trusted intermediary.

Figure 7:
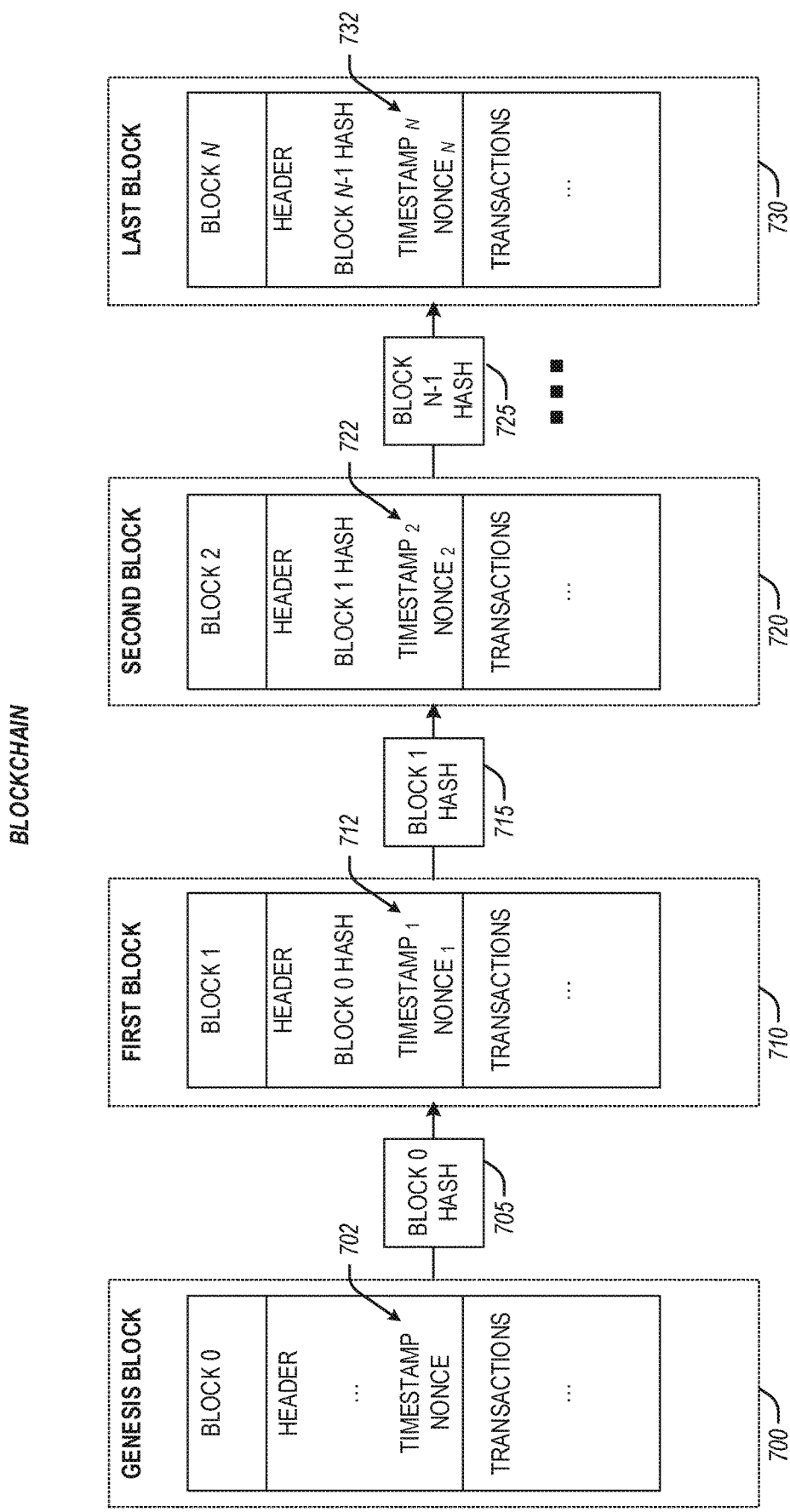
FIG. 7 illustrates a block diagram depicting timestamp values linked within a blockchain, according to an example.

FIG. 7 illustrates a block diagram of a blockchain, specifically depicting timestamp values linked within the blockchain among multiple blocks 700, 710, 720, 730. The timestamp field in such a ledger (e.g., timestamp 702 in block 0 700, timestamp$_1$ 712 in block 1 710, timestamp$_2$ 722 in block 2 720, timestamp$_N$ 732 in block N 730, is conventionally provided at a very coarse-grained granularity—typically seconds, or tens or hundreds of milliseconds. The purpose of this timestamp field is to ensure that multiple parties have a common view, not only of the transactional updates, but also about when the updates occurred, because different nodes receive the updates (in blocks) at different times in the network (because the nodes are not a single entity). Thus, some variation is possible to exist among timestamps included in respective blocks and the resulting hash values 705, 715, 725 of such blocks even as the blocks are linked together in the blockchain.

Distributed ledgers such as blockchain, and private blockchain implementations in particular, are a good fit for recording information for transactions in edge computing services. A permissioned blockchain (or some variant of this type of ledger) is very likely to be used in many settings for achieving trust in edge computing system interactions. At administrative, organizational, or ownership boundaries between different service providers, the state changes produced by edge operations (transactions) need to be protected from unilateral or arbitrary retraction or abrogation, within a larger, pre-established trust mechanism between parties in a permissioned blockchain.

Permissioned blockchains also address the need for different levels of privacy among different parties for different operation. Participants in edge transactions are likely to have trust relationships with some infrastructure or service provider (e.g., a cloud service provider, a telecommunications or internet service provider, etc.), and these service providers are usually large businesses or consortia that are capable of implementing a permissioned blockchain.

Due to low latency and cost-efficiency requirements it is desirable to achieve transactions without delays that would arise from having mediating third parties directly provide security measures. This makes permissioned blockchains a natural fit for edge computing transactions in many EaaS and FaaS scenarios. Even at a single edge node, multiple domains can intersect and interact with one another. Thus, as the number of parties in edge interchanges expand—from humans to IoT devices to infrastructure and communication service providers, arbitrators, implementors, data providers, etc.—transactions become quite widely distributed. However, the following techniques are not limited to permissioned blockchain implementations.

In these and other contexts involving blockchain, coordinated and fine-grained time values provide significant benefits. Typically, one block of the blockchain (e.g., block 700 as depicted in FIG. 7) may actually contain many internal sub-blocks, and these sub-blocks may also carry chains of transactions. This is with the assumption that each such sub-block may be adapted to include a high precision timestamp (e.g., generated with the techniques discussed below) to be applied to the data that is replicated across many edge nodes, storage devices, etc. Recovering these time fields, and verifying that none of them have been tampered with or accidentally corrupted, is essential to confirm security of the underlying transaction actions. Such verification can be performed from security first principles—such as by verifying that the blocks are not tampered with (e.g., by validating their hashes)—and then traversing to each subblock to recover the timestamps and updating the timestamps over the data.

In edge computing settings where latencies matter and where the computational resources are restricted or controlled, constantly verifying and updating data in blockchains is prohibitive and wasteful. Amortizing the overhead is also difficult, because different nodes may need to check that data they are operating on reflects the latest transactional update. Likewise, in edge computing settings involving MVCC, accurate and trustworthy time data is needed in order to determine the order and result of transactions. Even in implementations such as Google Spanner, which perform transactions updates over distributed caches, MVCC is applied in traditional data center cloud settings, where the need to verify the integrity of the timestamp does not come up, and where the power, latency, and bandwidth constraints are secondary to achieving concurrency and scale in the data center.

As evidenced by the techniques discussed below, the integrity and use of fine-grained and securely generated (and verifiable) timestamps and timing data provides an important benefit to blockchain implementations, MVCC implementations, and a variety of other transactions within a distributed edge computing network.

Coordinated Time Generation and Verification in Edge Computing Settings

Various approaches have been attempted to generate coordinated time stamps among distributed computing system clocks. For example, coordinated clocks may be produced using IEEE standard 1588-2019 (Precision Time Protocol, "PTP"), which is a mechanism that allows machines to synchronize their clocks. With PTP, two machines may be very far apart on the network and use independent time sources, and still be able to reach an agreement about a common reference time such as UTC (universal coordinated time). Machines typically use software algorithms to compute and maintain alignment with a common reference clock at a granularity of roughly 1 ms (typically ranging from sub-microseconds to 10 ms and beyond).

To implement PTP, an Ethernet, Wi-Fi, or 5G/ultra-low latency communication (URLLC) controller/user equipment (UE) implements a hardware counter whose phase and frequency offset with respect to the PTP network-time reference is regularly measured and compensation computed precisely. However, software, which is inherently non-deterministic, typically plays the key role in estimating the relationship between PTP time and the SW-accessible clock (e.g., via an Intel® Architecture (IA) instruction (such as in an x86 RDTSC (Read Time-Stamp Counter) instruction)). The use of software measurements in such networked settings may introduce a relatively large amount of uncertainty from relative time drifts, and may disrupt software access to accurate time (e.g., from drifts in the tens of microseconds).

Some hardware approaches, such as "Hammock Harbor" provided in some Intel® hardware implementations, are designed to enable hardware to deterministically relate the PTP time to CPU time through hardware cross-timestamps, achieving worst-case accuracy of less than hundreds of nanoseconds. Thus, accurate and fine-grained time is readable by software and by peripheral devices (e.g., network interface cards (NICs), host bus adapters (HBAs), etc.) synchronized to time sources (e.g., obtained from GPS/GNSS global positioning systems) communicating over various routers, switches, bridges, access points, wireless networks, etc.

At a high level, the Hammock Hardware approach works as follows: After the IEEE 1588 protocol synchronizes time to the network adapter, periodic timestamps of PTP time and CPU time (e.g., time stamp counter (TSC)) are captured simultaneously in hardware, making the timestamp pair available to software which then computes the resulting linearity relationship. Given also the tight synchronization between TSC across all coherent CPU cores and accelerators, this allows cooperating machines synchronized by PTP to make a common clock immediately available to application software.

The following techniques enable the coordination and verification of these and similar fine-grained timestamps in distributed computing settings, using hardware implementation and security verifications, to enable respective edge computing entities to trust fine-grained coordinated timing information. In this fashion, the following techniques may be utilized by MVCC implementations as well as both public and permissioned blockchains among distributed entities (with timestamp synchronization issues being more likely to be a problem in settings involving permissioned blockchains). The primary difference between permissioned and public blockchains, relative to the timing operations discussed herein, is how the right to enchain a new block to an existing chain is earned, but the following techniques provide a secure and verifiable way of generating a timestamp regardless of the end use case.

In an example, the physically verifiable sources of time information, such as PCI-e cards, storage HBAs, and processor CPUs, are extended to produce a timestamp that is cryptographically signed by a hardware key, and therefore cannot be altered without the alteration being detected. This permits a high resolution timestamp that is presently obtained through hardware mechanisms (such as Intel® Hammock Harbor) to be hardened with a hardware credential at the point of generation itself. For the CPU, this hardening may be provided by a new instruction that wires in the hardware credential tied to a machine (platform) RoT such as a TPM (or, a hardware mechanism that can eliminate even system OS software or hypervisor from tampering with the current software-accessible time). For non-CPU generators of the timestamp, an extension of those hardware parts may allow a secure credential to be generated and installed into them, to be used similarly, to automatically bind generated high-resolution timestamps to a machine and a hardware RoT.

The generation of a fine-grained timestamp confers a number of capabilities related to time for edge computing transactions. These capabilities include:

A) Verifying that the high-resolution timestamp passes the signature check (such as when a blockchain block is decrypted using the public key attached to the block, yielding the timestamp and nonce). This example may be part of an "approximate" check, which decrypts the timestamp and atomically compares it to the allowable range, based on the known worst-case time-synchronization inaccuracy.

B) Screening versioning information against the timestamp to qualify which data objects, if present in the local machine, need to have their versions brought forward (such as in a MVCC database). Screening may update a bitmap (e.g., using as little as 1 bit per data object, using a mapping function over data object IDs).

C) Marking the items whose versions change (in the screening operation B) discussed previously), so that software can easily check if any data used in an operation needs to be updated to its most recent value. The majority of the data may be expected to not require an update, so this quick check allows for better efficiency.

D) Extracting and indexing the updates into a hardware-based cuckoo hash or hopscotch hash, for space and time efficient retrieval of the latest value of any item that is marked as updated. Other forms of hashing or indexing may also be used.

Any of the above actions A)-D) might be implemented in software, but at the cost of instructions and considerable latency to do so, particularly since verification action A) may take significant time in software. Further, if such verification is done in software, the software agent that performs these actions would need to be invulnerable, and therefore need to run in a hardware or software sandbox (e.g., provided by a hardware sandbox such as an SGX or TrustZone trusted execution environment). The above actions A)-D), therefore, are particularly apt for hardware-based processing when established as unmodifiable actions that can be implemented in hardware.

Further, these capabilities establish an end-to-end trustable high resolution timestamp as a very lightweight versioning mechanism that is not vulnerable to multi-tenant execution of agents from more than a single domain. Even if these agents are in some trust relationship that allows them to use an enterprise blockchain for efficient immutable audit trail, the timestamps governing the versioning, and thus the progress of transactions distributed across these agents over many machines, are guaranteed to be tamper proof by virtue of hardware-based RoT.

Figure 8:
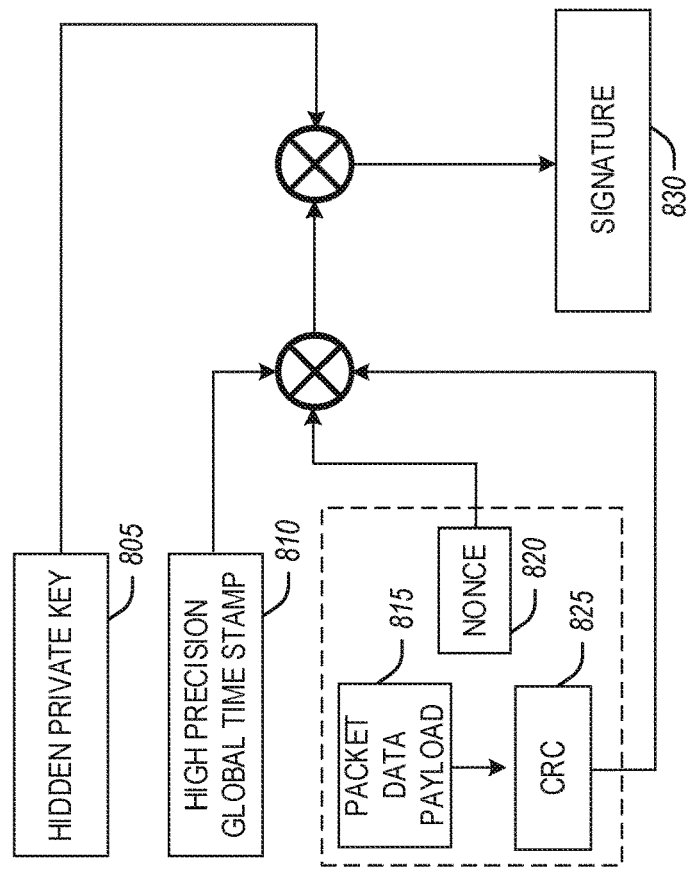
FIG. 8 illustrates a block diagram of a signed timestamp generation procedure, according to an example.

FIG. 8 depicts a block diagram of an example signed timestamp generation scenario. For use with this signature generation scenario, an immutable secure high resolution global time stamp 810 has been created from use of a global aligned high precision timestamp generation mechanism (e.g., generated with Hammock Harbor or other hardware implementation, and with use of the Precision Time Protocol (PTP/IEEE 1588) or other time coordination procedure, as discussed above). In an example, the timestamp generation mechanism would be automatic and protected within a hardware interface card, a NIC, a memory/storage/network controller, etc. The timestamp generation mechanism may also be protected, alternatively, by a software engine such as that which may be run in a trusted execution environment (e.g., Intel® SGX) as part of a smart contract.

FIG. 8 further depicts the extraction of a nonce 820 and a CRC 825 from an edge transaction packet data payload 815 (e.g., from a blockchain block). The CRC 825, the nonce 820, and the high precision global time stamp 810 are provided to a signing algorithm, which applies a hidden private key 805 to produce a signature 830. In a further example, the hidden private key 805 may be a key generated according to a DICE specification, such that the timestamp may be implicitly attested as part of the use of the key (e.g., to sign a challenge). Further, the produced timestamp has the added characteristic that the data associated with the timestamp 910 indicates freshness (data freshness) according to the time when the data is changed or transformed, whereas the signature 830 indicates freshness (payload freshness) according to the time that the signature was applied.

Figure 9:
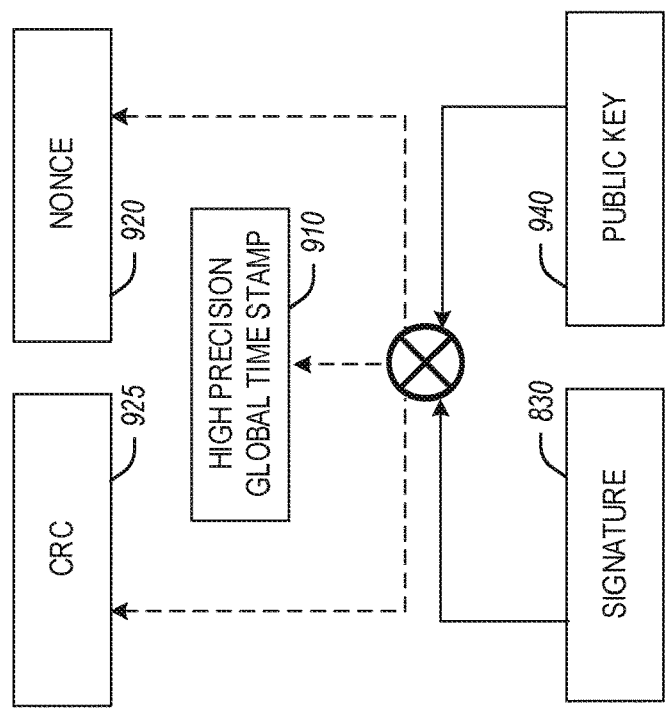
FIG. 9 illustrates a block diagram of a signed timestamp verification procedure, according to an example.

FIG. 9 depicts a block diagram of an example timestamp verification scenario. Within this diagram, the process of verifying that a received packet, message, transaction block, or other time-based data is valid, is produced from an evaluation of a signature associated with the high precision global time stamp 810 and accompanying data. As will be understood, in some scenarios, this verification scenario may be implemented in an inline fashion on a smart (programmable) NIC. With use of a smart NIC, transactions can be signed to use the proposed verification scheme as implemented in the NIC, rather than only on the CPU.

As shown in FIG. 9, a verification scenario may be performed with the use of a signature verifying algorithm, which determines the validity of the data based on a public key 940 (e.g., corresponding to the private key 805 used in FIG. 8) and the signature 830 (e.g., generated according to the process of FIG. 8). This verification scenario can be specifically used to attest to the validity of the transaction data's timestamp 910, nonce 920, and CRC 925 fields.

To accomplish this verification in a trusted manner, the verifier has to possess a trust anchor that identifies the manufacturer of the high precision global time stamp and implementer of the timestamp signature function. If operating in the context of a blockchain, miners may double as attestation verifiers where part of the consensus algorithm includes contributing the trust anchors each miner is using to determine trust in the timestamp to the blockchain. A consensus algorithm will ensure a majority of miners agree regarding which trust anchor(s) to use to terminate certificate path validation.

As understood, an asymmetric key-based process of signing and verification is illustrated in the diagrams of FIGS. 8 and 9. For enterprise blockchains, the use of an asymmetric key signature can be replaced with a SHA256-based hash, since there is not a fear of an unknown, untrustworthy intermediary in such exchanges. In other examples, the process may be protected with a symmetric key based signature, where the symmetric key is agreed to by the parties in an enterprise blockchain agreed-to setup (with an agreed objective including non-repudiability).

Because the underlying data (accompanying a timestamp) to be verified is small, and the verification process is intended to only cover verification of the CRC and not the packet or block data as a whole, the use of public keys does not present a significant performance barrier for an implementing computing system. Thus, the key generation and verification process may be operated in a variety of hardware locations (e.g., as part of a host bus adapter, or as part of hardware assisted features in network cards or controllers, such as with use of Intel® Quick Assist Technology (QAT)).

In further examples, a specification may be provided or defined for certain areas of data verification to be performed. A CRC may be defined to cover all the information, but the validation process may involve verification of some semantic information such as: the number value is under 50, or over 100, etc. Thus, an evaluation may be performed based on a check of the CRC plus some parts of the payload (decided dynamically, for instance, depending on the type of data). Also in further examples, multiple CRCs may potentially be used for verification (such as one per different region). The use of multiple CRCs may enable identification of what has been corrupted or changed in more granularity, and to keep processing if the data corrupted or changed is not critical or substantial.

Figure 10:
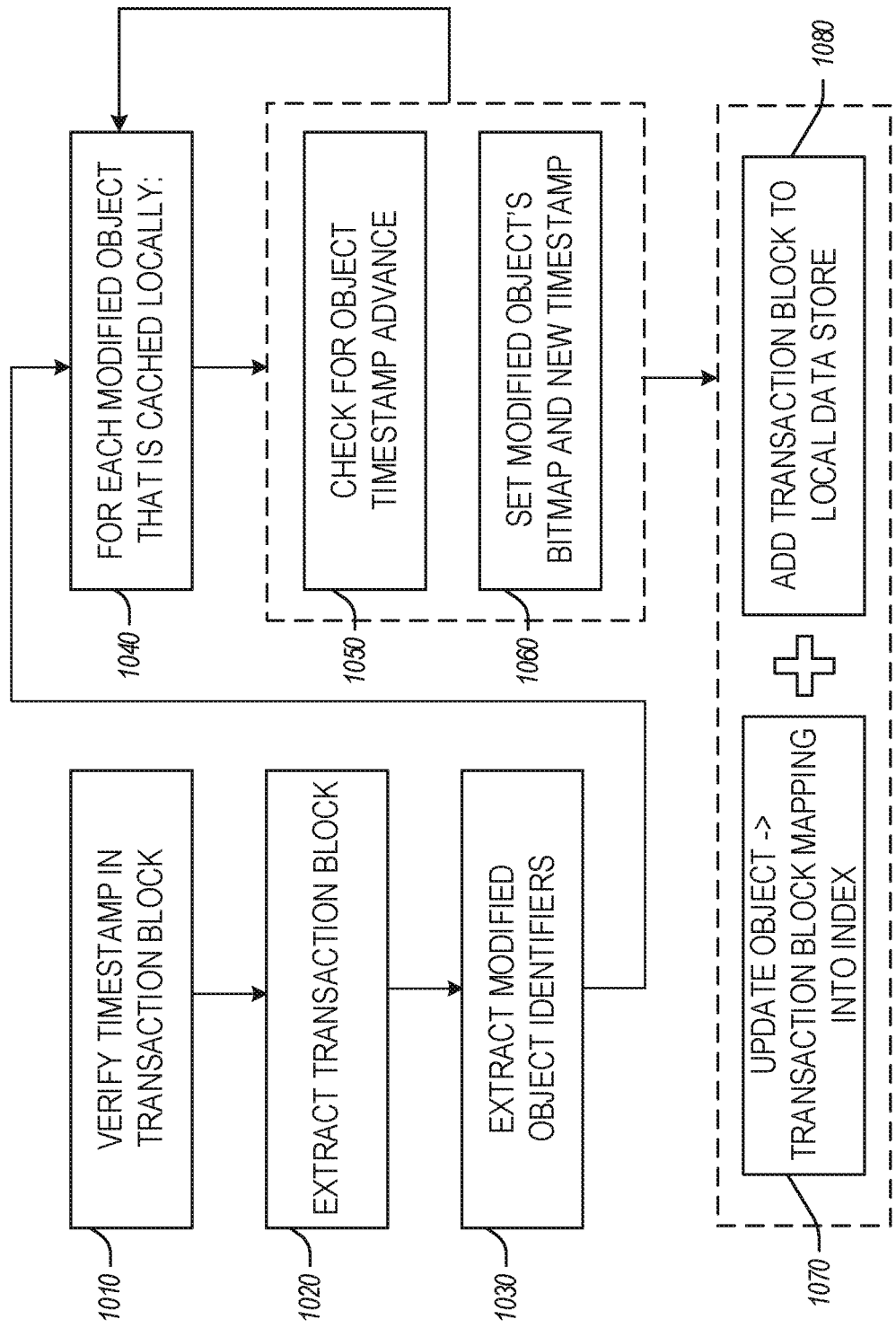
FIG. 10 illustrates a flowchart of a process for verifying a transaction block based on a signed timestamp verification procedure, according to an example.

FIG. 10 illustrates a flowchart of a process for verifying a transaction block based on a signed timestamp verification procedure. This flowchart further depicts operations based on the generation and verification operations outlined above.

Upon receiving transaction blocks that include verifiable timestamps, in operation 1010, the timestamp is verified (e.g., by verifying the signature for the timestamp, as described in FIG. 9). Next, the data contents of the transaction are extracted in operation 1020, and from these contents, the objects that are modified as a result of this transaction are identified, in operation 1030.

At operation 1040, a virtual list is created, to identify all objects cached locally that are updated as of the timestamp. Some of those objects may carry a newer timestamp than that in the transaction block, simply due to the decentralized operations that are not synchronized by locks, mutexes, multi-phase commit protocols, etc.

Data objects that are cached locally and have an older timestamp as determined from operation 1050 (e.g., identified from metadata maintained for the object), are identified to be updated (or otherwise modified) in operation 1060. Additionally, in operation 1060, a bitmap index is updated as described below (e.g., with reference to FIG. 11) to identify that the particular object has been modified. Although this operation and the following description refers to the use of a simple bitmap table, any implementation that allows for a fast determination of which objects are locally cached but need to be updated from a record of transaction blocks may be employed with these techniques.

In an example, a specific data structure such as an index, a bitmap index, a rangemap etc., is used to rapidly identify objects that have been updated by some time-based transaction whose transaction block has been received locally. This enables decentralized MVCC to be effective in proceeding with data transactions—under the optimistic assumption that an object that is locally cached is either already up to date, or can be brought up to date locally; and only at transaction commit time, is it necessary to verify whether or not that optimistic assumption was valid. Because timestamps used as versioning aids are being kept current globally with fine-grained synchronized clocks (sub-microsecond granularity), the likelihood of objects not being kept up to date is made very low, and thus the exception case—where transactions have to be canceled or deferred (and therefore re-tried by a shepherd approach) due to races that were discovered after the fact, is made extremely rare.

To facilitate the update of objects locally, operation 1070 shows an indexing into storage of transaction blocks received and stored in monotonic time order, locally. (This is not the time order in which the blocks are received, but the order among their timestamps). The index into this storage is from a structure that facilitates a lookup, from each object ID, to the most recent transaction block that contains an update to that object. Based on the use of the index in this or similar fashions, the transaction block is added (or updated, modified, etc.) in the local data store in operation 1080.

In a further example, two indexes may be maintained: one for the earliest transaction block, and one for the latest transaction block, so that a complex object that is updated in different transaction blocks can be searched for by using a localized search between the two indexes. A set of background threads can update the objects proactively by processing the transaction blocks in timestamp order, and thus bringing objects (and their versions) up to date; this means that at any point in time, the amount of work necessary to render the transaction blocks that are pending to get their updates reflected is kept very small.

Figure 11:
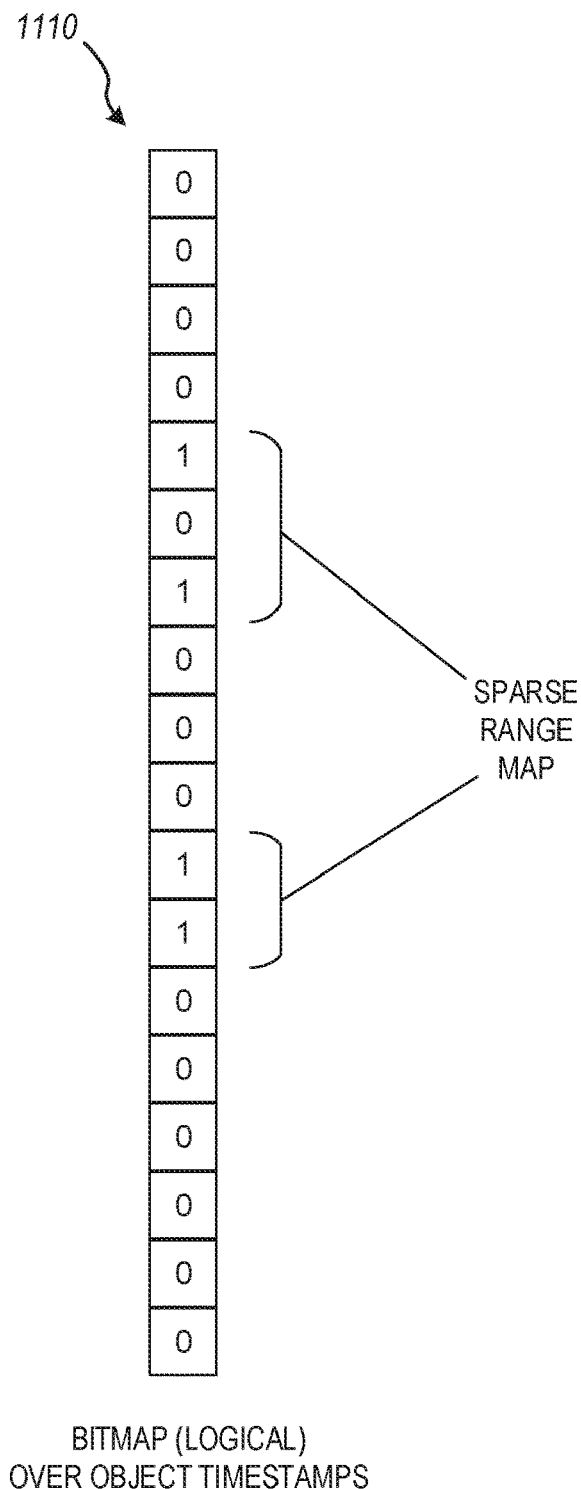
FIG. 11 illustrates a block diagram of an index mapping used in a timestamp verification procedure, according to an example.

FIG. 11 illustrates a block diagram of an index mapping used in a timestamp verification procedure, for use with distributed edge transactions as discussed above. Specifically, FIG. 11 provides an illustration of a bitmap index 1110 and optional rangemaps implemented over the bitmap index. The bitmap index may be used to enable any local software at a node to identify, with just one test, whether or not a data object it is reading from has been updated in any of the un-processed transaction blocks (e.g., where 0=not updated). In this manner, the index works in a fashion similar to a bloom filter, to quickly identify whether some attribute is not true.

The usage of this index may involve a threshold, used to ensure that the number of "1" bits should be kept very small, and may be accompanied with logic to accelerate the background rendering steps if that count crosses a threshold. A rangemap over the bitmap index permits the bitmap index to be very large and still be consulted quickly, based on the object's identifier.

With use of the present techniques that enable the authenticated use of granular time stamps, the chances of timestamp collision are particularly small. With sharply reduced possibility of a time collision (which may or may not require conflicting transactions to be reversed, annulled, or retried as discussed shortly), the majority of transactions complete quickly and efficiently, and only those rare transactions that experience a time collision have to be subject to further scrutiny. In general, the following strategies for resolution, or similar approaches, may be utilized in the rare event of a time collision.

A first strategy for timestamp collision may include the use of a Rollback-retry (also referred to as "abort-retry") strategy uses a change log, critical section or mutex context to identify the set of deltas that must be considered atomically to ensure expected ACID properties. All identified changes are returned to the processing agent(s) for re-processing. This approach may have scalability challenges as the number distributed processing agents increases.

Another strategy for timestamp collision may include the use of Notify-ignore strategy considers scenarios where ACID requirements may be relaxed or where data integrity requirements are less stringent. For example, an IoT network that monitors atmospheric conditions may produce largely the same data at each sample. Hence, it may be acceptable to simply ignore transactions where collisions occur, and toss out data affected by a time stamp collision.

Another strategy for timestamp collision may include the use of a bucket-continue strategy. This strategy considers scenarios where data serialization need not be strict. For example, distributed video processing may result in codecs that produce overlapping encodings. The decoding results may be similar (if not identical); however, the differences may be negligible, thus one or the other can be discarded while the first is retained and processing continues normally. Alternatively, colliding data objects can be merged according to a function that averages the delta between them.

Other collision resolution strategies may be considered in the context of the varying ACID properties of the data being manipulated. Accordingly, an edge computing transaction may include metadata describing applicable ACID properties may be included with the timestamped data such that localized collision resolution can be applied using one of the above-mentioned strategies or by a strategy not explicitly mentioned.

Figure 12:
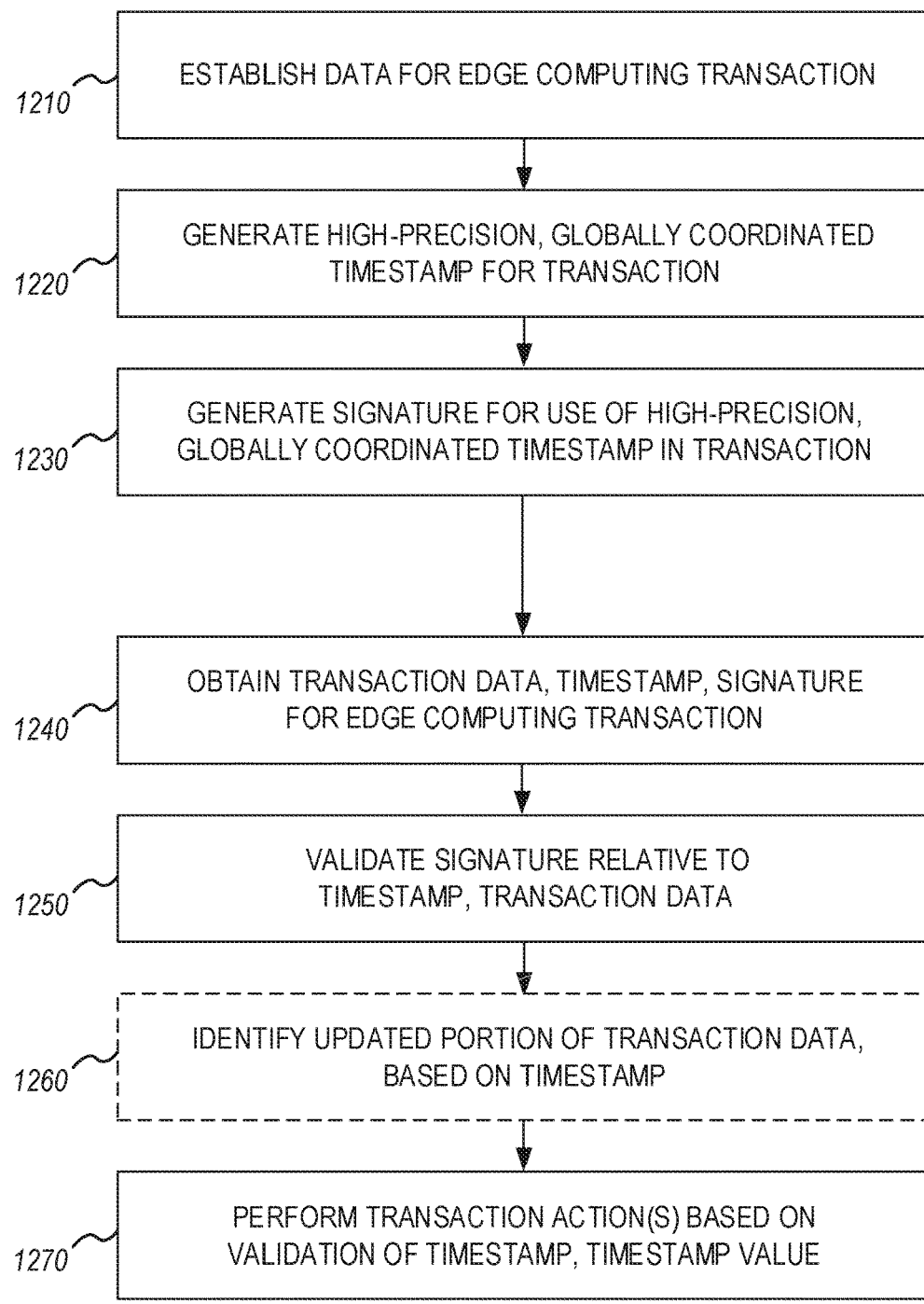
FIG. 12 illustrates a flowchart of an example process for deploying and utilizing a signed timestamp verification for transactions within an edge computing platform, according to an example.

FIG. 12 illustrates a flowchart 1200 of an example process for deploying and utilizing a signed timestamp verification for transactions within an edge computing platform. The following operations 1240-1270 of flowchart 1200 are illustrated from the perspective of a data-implementing edge computing device which includes hardware to verify and utilize data associated with a verified timestamp; the operations 1210-1230 are illustrated from the perspective of a data-producing edge computing device which includes hardware to generate data and produce the verified timestamp and transaction information. The transaction suggested in these examples may be performed as part of a number of different transaction events (e.g., as part of an edge computing service action, workload usage, etc.). However, it will be understood that other corresponding operations, transactions, and data actions may also be implemented by or on behalf of other entities, or within other components of hardware or hardware systems.

The flowchart 1200 begins with operation 1210, performed by an entity of the edge computing system (the data-producing edge computing device), to establish data in connection with the edge computing transaction, such as part of a blockchain transaction, a database transaction, etc. This transaction may supply data updates, changes, addition, deletions, etc., that are a portion of a larger data set (a transaction data set). For example, the transaction may be supplied to the data-implementing edge computing device via a network to update a previous version of the transaction data set. The data set may be provided to update, add, change, or host data in a data store (e.g., database), with performance of the transaction at the data-implementing edge computing device to cause data for the transaction (transaction data) to be written to the data store located at or coupled to the hardware platform (e.g., a data store hosted in a storage device).

As discussed in the examples above, the transaction may involve use of a multi-version concurrency control (MVCC) database transaction, where the MVCC database transaction is performed using a time value of the timestamp. In other examples, the transaction is a blockchain transaction, as the transaction data is provided in a block of a blockchain, where the following timestamp value is included in the block. (For instance, the blockchain may be a permissioned blockchain, as discussed above).

The flowchart 1200 continues with operation 1220, to generate a high-precision, globally coordinated timestamp for the edge computing transaction, at the data-producing edge computing device, and among other distributed entities of the edge computing system. This may include a timestamp generated with a coordinated timestamp procedure at a hardware platform, even as a coordinated timestamp is generated at another entity (and entities) of the edge computing system. For instance, a coordinated timestamp procedure may be performed using a network-coordinated timestamp coordination procedure between a system clock of an edge computing device and a system clock of another entity, as the edge computing device and the another entity deterministically relate a coordinated timestamp at the respective system clocks using hardware cross-timestamps. In specific examples, clocks used to generate timestamps at the edge computing device and the another entity are coordinated with synchronization performed according to a Precision Time Protocol.

The flowchart 1200 continues with operation 1230, to generate a signature for use of the high-precision, globally coordinated timestamp with the edge computing transaction. In specific examples, the timestamp signature is generated using a private key provided from an asymmetric encryption process, to allow later validation of the timestamp signature (in operation 1250, discussed below) to be performed based on verification of the timestamp and the transaction data using a public key corresponding to the private key. In a specific example involving a blockchain, the timestamp signature is generated at the trusted hardware environment using a nonce and a cyclic redundancy check (CRC) value for the transaction data, as the nonce and the CRC value are provided in the block of the blockchain.

The flowchart 1200 continues with operation 1240, to obtain the transaction data, timestamp, and the generated signature in connection with the edge computing transaction. This timestamp is generated from a coordinated timestamp procedure at another entity of the edge computing system (e.g., with operation 1220), and the timestamp signature generated from a trusted hardware environment of the another entity based on the timestamp and the transaction data (e.g., with operations 1230). For instance, these operations may be implemented by network interface circuitry to receive the transaction data, the timestamp, and the timestamp signature via a network of the edge computing system.

The flowchart 1200 continues with operation 1250, to validate the signature, relative to the timestamp and transaction data provided for the edge computing transaction. In specific examples, the operations to verify the timestamp for the transaction are based on hardware operations performed in circuitry (e.g., implemented with hardware instructions)

in the edge computing device. Based on this verification, the trusted hardware environment of the another entity is attested to a particular edge computing device based on a hardware root of trust known to the particular edge computing device.

The flowchart 1200 continues with an optional operation 1260, to identify an updated portion of the transaction data within the overall transaction, based on the timestamp. For example, in a scenario where a previous version of the transaction data set is indexed at the edge computing device in an index, then only portions of transaction data set may be updated based on the index. For instance, perform the transaction in the edge computing device, based on values of the index, may cause an update of respective portions of a transaction data set based on an indication of a changed version for the respective portions of the transaction data set, as indicated by the index. The index may be generated by identifying, based on the transaction data, a value of the index which corresponds to the portion of the transaction data set, such that the value of the index corresponds to the previous version of the transaction data. The index may be updated by setting the value of the index, in response to a timestamp value changing for the portion of the transaction data set, such that the value of the index is set to indicate a changed version of the transaction data within the transaction data set.

The flowchart 1200 continues at operation 1270 by performing one or more transaction actions, based on the validation of the timestamp and timestamp value. For example, performing the transaction may cause transaction data to be written to the data store. In a further example, performing the transaction in the edge computing device causes an update of a prior version of the transaction data in the data store, wherein the update of the transaction data in the data store is tracked within a bitmap index. Other transactional actions with data and data sets may also be performed.

Implementation of the preceding techniques may be accomplished through any number of specifications, configurations, or example deployments of hardware and software. It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

ADDITIONAL NOTES & EXAMPLES

Additional examples of the presently described method, system, and device embodiments include the following, non-limiting configurations. Each of the non-limiting examples may stand on its own, or may be combined in any permutation or combination with any one or more of the other examples provided below or throughout the present disclosure.

Example 1 is an edge computing device operable in an edge computing system, comprising: processing circuitry; and a storage medium comprising instructions stored thereon, wherein the instructions, when executed by the processing circuitry, configure the processing circuitry to perform operations to: obtain transaction data, a timestamp, and a timestamp signature for a transaction, the timestamp generated from a coordinated timestamp procedure at another entity of the edge computing system, and the timestamp signature generated from a trusted hardware environment of the another entity based on the timestamp and the transaction data; verify the timestamp for the transaction based on validation of the timestamp signature and the transaction data for the transaction; and perform the transaction in the edge computing device, using the transaction data, in response to successful verification of the timestamp.

In Example 2, the subject matter of Example 1 includes, subject matter where the transaction is conducted at the edge computing device using a value of the timestamp.

In Example 3, the subject matter of Example 2 includes, subject matter where the transaction is a multi-version concurrency control (MVCC) database transaction, wherein the MVCC database transaction is performed using a time value of the timestamp.

In Example 4, the subject matter of Examples 2-3 includes, subject matter where the transaction data is provided in a block of a blockchain, and wherein the timestamp is included in the block.

In Example 5, the subject matter of Example 4 includes, subject matter where the blockchain is a permissioned blockchain.

In Example 6, the subject matter of Examples 4-5 includes, subject matter where the timestamp signature is generated at the trusted hardware environment of the another entity using a nonce and a cyclic redundancy check (CRC) value for the transaction data, and wherein the nonce and the CRC value are provided in the block of the blockchain.

In Example 7, the subject matter of Examples 1-6 includes, subject matter where the trusted hardware environment of the another entity is attested to the edge computing device based on a hardware root of trust known to the edge computing device.

In Example 8, the subject matter of Examples 1-7 includes, subject matter where the transaction data is provided as a portion of a transaction data set, and wherein a previous version of the transaction data set is indexed at the edge computing device in an index, the processing circuitry further configured to perform operations to: identify, based on the transaction data, a value of the index which corresponds to the portion of the transaction data set, wherein the value of the index corresponds to the previous version of the transaction data; and set the value of the index, in response to a timestamp value changing for the portion of the transaction data set, wherein the value of the index is set to indicate a changed version of the transaction data within the transaction data set.

In Example 9, the subject matter of Example 8 includes, subject matter where the operations to perform the transaction in the edge computing device are conducted based on values of the index, to update respective portions of the transaction data set based on an indication of a changed version for the respective portions of the transaction data set, as indicated by the index.

In Example 10, the subject matter of Examples 1-9 includes, subject matter where the another entity is a second edge computing device, and wherein clocks used to generate timestamps at the edge computing device and the second edge computing device are coordinated with synchronization performed according to a Precision Time Protocol.

In Example 11, the subject matter of Examples 1-10 includes, subject matter where the timestamp signature is generated using a private key provided from an asymmetric encryption process, and wherein the validation of the timestamp signature is performed based on validation of the timestamp and the transaction data using a public key corresponding to the private key.

In Example 12, the subject matter of Examples 1-11 includes, a storage device, hosting data for a data store; wherein performing the transaction causes the transaction data to be written to the data store.

In Example 13, the subject matter of Example 12 includes, subject matter where performing the transaction in the edge computing device causes an update of a prior version of the transaction data in the data store, wherein the update of the transaction data in the data store is tracked within a bitmap index.

In Example 14, the subject matter of Examples 1-13 includes, subject matter where the operations to verify the timestamp for the transaction are based on hardware operations performed in circuitry of the edge computing device.

In Example 15, the subject matter of Examples 1-14 includes, network interface circuitry to receive the transaction data, the timestamp, and the timestamp signature via a network of the edge computing system; wherein the coordinated timestamp procedure is performed using a network-coordinated timestamp coordination procedure between a system clock of the edge computing device and a system clock of the another entity, and wherein the edge computing device and the another entity deterministically relate a coordinated timestamp at the respective system clocks using hardware cross-timestamps.

Example 16 is a method performed by an edge computing device of an edge computing system, and the method comprising: obtaining transaction data, a timestamp, and a timestamp signature for a transaction, the timestamp generated from a coordinated timestamp procedure at another entity of the edge computing system, and the timestamp signature generated from a trusted hardware environment of the another entity based on the timestamp and the transaction data; verifying the timestamp for the transaction based on validation of the timestamp signature and the transaction data for the transaction; and performing the transaction in the edge computing device, using the transaction data, in response to successful verification of the timestamp.

In Example 17, the subject matter of Example 16 includes, subject matter where the transaction is conducted at the edge computing device using a value of the timestamp.

In Example 18, the subject matter of Example 17 includes, subject matter where the transaction is a multi-version concurrency control (MVCC) database transaction, wherein the MVCC database transaction is performed using a time value of the timestamp.

In Example 19, the subject matter of Examples 17-18 includes, subject matter where the transaction data is provided in a block of a blockchain, and wherein the timestamp is included in the block.

In Example 20, the subject matter of Example 19 includes, subject matter where the blockchain is a permissioned blockchain.

In Example 21, the subject matter of Examples 19-20 includes, subject matter where the timestamp signature is generated at the trusted hardware environment of the another entity using a nonce and a cyclic redundancy check (CRC) value for the transaction data, and wherein the nonce and the CRC value are provided in the block of the blockchain.

In Example 22, the subject matter of Examples 16-21 includes, subject matter where the trusted hardware environment of the another entity is attested to the edge computing device based on a hardware root of trust known to the edge computing device.

In Example 23, the subject matter of Examples 16-22 includes, subject matter where the transaction data is provided as a portion of a transaction data set, and wherein a previous version of the transaction data set is indexed at the edge computing device in an index, the method further comprising: identifying, based on the transaction data, a value of the index which corresponds to the portion of the transaction data set, wherein the value of the index corresponds to the previous version of the transaction data; and updating the value of the index, in response to a timestamp value changing for the portion of the transaction data set, wherein the value of the index is updated to indicate a changed version of the transaction data within the transaction data set.

In Example 24, the subject matter of Example 23 includes, performing the transaction in the edge computing device based on values of the index, to update respective portions of the transaction data set based on an indication of a changed version for the respective portions of the transaction data set, as indicated by the index.

In Example 25, the subject matter of Examples 16-24 includes, subject matter where the another entity is a second edge computing device, and wherein clocks used to generate timestamps at the edge computing device and the second edge computing device are coordinated with synchronization performed according to a Precision Time Protocol.

In Example 26, the subject matter of Examples 16-25 includes, subject matter where the timestamp signature is generated using a private key provided from an asymmetric encryption process, and wherein validation of the timestamp signature is performed based on validation of the timestamp and the transaction data using a public key corresponding to the private key.

In Example 27, the subject matter of Examples 16-26 includes, subject matter where performing the transaction causes the transaction data to be written to a data store operated by the edge computing device.

In Example 28, the subject matter of Example 27 includes, subject matter where performing the transaction in the edge computing device causes an update of a prior version of the transaction data in the data store, wherein the update of the transaction data in the data store is tracked within a bitmap index.

In Example 29, the subject matter of Examples 16-28 includes, subject matter where verifying the timestamp for the transaction is performed based on hardware operations performed in circuitry of the edge computing device.

In Example 30, the subject matter of Examples 16-29 includes, receiving the transaction data, the timestamp, and the timestamp signature via a network of the edge computing system; wherein the coordinated timestamp procedure is performed using a network-coordinated timestamp coordination procedure between a system clock of the edge computing device and a system clock of the another entity, and wherein the edge computing device and the another entity deterministically relate a coordinated timestamp at the respective system clocks using hardware cross-timestamps.

Example 31 is at least one non-transitory machine-readable storage medium comprising instructions or stored data which may be configured into instructions, wherein the instructions, when configured and executed by processing circuitry of a computing device, cause the processing circuitry to perform any of the operations of Examples 16 to 30.

Example 32 is an apparatus, operable in an edge computing system, the apparatus comprising: means for obtaining transaction data, a timestamp, and a timestamp signature for a transaction, the timestamp generated from a coordinated timestamp procedure at another entity of the edge computing system, and the timestamp signature generated from a trusted hardware environment of the another entity based on the timestamp and the transaction data; means for verifying the timestamp for the transaction based on validation of the timestamp signature and the transaction data for the transaction; and means for performing the transaction, using the transaction data, in response to successful verification of the timestamp.

In Example 33, the subject matter of Example 32 includes, means for performing the transaction using a value of the timestamp.

In Example 34, the subject matter of Example 33 includes, means for performing the transaction as a multi-version concurrency control (MVCC) database transaction, wherein the MVCC database transaction is performed using a time value of the timestamp.

In Example 35, the subject matter of Examples 33-34 includes, means for obtaining the transaction data from a block of a blockchain, wherein the timestamp is included in the block.

In Example 36, the subject matter of Example 35 includes, subject matter where the blockchain is a permissioned blockchain.

In Example 37, the subject matter of Examples 35-36 includes, means for extracting the block of the blockchain, wherein the timestamp signature is generated at the trusted hardware environment of the another entity using a nonce and a cyclic redundancy check (CRC) value for the transaction data, and wherein the nonce and the CRC value are provided in the block of the blockchain.

In Example 38, the subject matter of Examples 33-37 includes, means for attesting the trusted hardware environment of the another entity based on a hardware root of trust known to the apparatus.

In Example 39, the subject matter of Examples 33-38 includes, means for obtaining the transaction data from a portion of a transaction data set, and wherein a previous version of the transaction data set is indexed in an index; means for identifying, based on the transaction data, a value of the index which corresponds to the portion of the transaction data set, wherein the value of the index corresponds to the previous version of the transaction data; and means for updating the value of the index, in response to a timestamp value changing for the portion of the transaction data set, wherein the value of the index is updated to indicate a changed version of the transaction data within the transaction data set.

In Example 40, the subject matter of Example 39 includes, means for performing the transaction based on values of the index, to update respective portions of the transaction data set based on an indication of a changed version for the respective portions of the transaction data set, as indicated by the index.

In Example 41, the subject matter of Examples 33-40 includes, means for generating timestamps in coordination with the another entity with synchronization performed according to a Precision Time Protocol, wherein the another entity is a second edge computing device.

In Example 42, the subject matter of Examples 33-41 includes, means for generating the timestamp signature using a private key provided from an asymmetric encryption process, and wherein validation of the timestamp signature is performed based on validation of the timestamp and the transaction data using a public key corresponding to the private key.

In Example 43, the subject matter of Examples 33-42 includes, means for causing the transaction data to be written to a data store.

In Example 44, the subject matter of Example 43 includes, means for causing an update of a prior version of the transaction data in the data store, wherein the update of the transaction data in the data store is tracked within a bitmap index.

In Example 45, the subject matter of Examples 33-44 includes, means for verifying the timestamp for the transaction is performed using hardware operations.

In Example 46, the subject matter of Examples 33-45 includes, means for receiving the transaction data, the timestamp, and the timestamp signature via a network of the edge computing system; wherein the coordinated timestamp procedure is performed using a network-coordinated timestamp coordination procedure between a system clock of the apparatus and a system clock of the another entity, and wherein the apparatus and the another entity deterministically relate a coordinated timestamp at the respective system clocks using hardware cross-timestamps.

Example 47 may include one or more computer-readable storage media comprising data to cause an electronic device, upon loading, execution, configuration, or provisioning of the data by one or more processors or electronic circuitry of the electronic device, to perform one or more elements of a method described in or related to any of Examples 1-46, or any other method or process described herein.

Example 48 may include an apparatus comprising logic, modules, or circuitry to perform one or more elements of a method described in or related to any of Examples 1-46, or any other method or process described herein.

Example 49 may include a method, technique, or process as described in or related to any of Examples 1-46, or portions or parts thereof.

Example 50 may include an apparatus comprising: one or more processors and one or more computer readable media comprising instructions that, when executed by the one or more processors, cause, configure, or adapt the one or more processors to perform the method, techniques, or process as described in or related to any of Examples 1-46, or portions thereof.

Example 51 may include a signal as described in or related to any of examples 1-46, or portions or parts thereof.

Example 52 may include a signal in a wireless network as described in or related to any of Examples 1-46, or as otherwise shown and described herein.

Example 53 may include a method of performing or coordinating communications in a wireless network as described in or related to any of Examples 1-46, or as otherwise shown and described herein.

Example 54 may include a device for processing communication as described in or related to any of Examples 1-46, or as otherwise shown and described herein.

Example 55 is a network comprising respective devices and device communication mediums for performing any of the operations of Examples 1-46, or as otherwise shown and described herein.

Example 56 is a network interface card comprising circuitry, and implementing respective logic and functionality for performing any of the operations of Examples 1-46, or as otherwise shown and described herein.

Example 57 is time generation and coordinating circuitry, implementing respective logic and functionality for performing any of the operations of Examples 1-46, or as otherwise shown and described herein.

Example 58 is a distributed database system comprising circuitry, and implementing respective logic and functionality for performing any of the operations of Examples 1-46, or as otherwise shown and described herein.

Example 59 is an edge cloud computing device implementation comprising processing nodes and computing units adapted for performing any of the operations of Examples 1-46, or as otherwise shown and described herein.

Example 60 is an apparatus comprising means to implement of any of Examples 1-46.

Example 61 is a system to implement of any of Examples 1-60.

Example 62 is a method to implement of any of Examples 1-60.

In the above Detailed Description, various features may be grouped together to streamline the disclosure. However, claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. An edge computing device operable in an edge computing system, comprising:
   processing circuitry; and
   a storage medium comprising instructions stored thereon, wherein the instructions, when executed by the processing circuitry, configure the processing circuitry to perform operations to:
   obtain transaction data, a timestamp, and a timestamp signature for a transaction, the timestamp generated from a coordinated timestamp procedure at another entity of the edge computing system, and the timestamp signature generated from a trusted hardware environment of the another entity based on the timestamp and the transaction data;
   verify the timestamp for the transaction based on validation of the timestamp signature and the transaction data for the transaction; and
   perform the transaction in the edge computing device, using the transaction data, in response to successful verification of the timestamp.

2. The edge computing device of claim 1, wherein the transaction is conducted at the edge computing device using a value of the timestamp.

3. The edge computing device of claim 2, wherein the transaction is a multi-version concurrency control (MVCC) database transaction, wherein the MVCC database transaction is performed using a time value of the timestamp.

4. The edge computing device of claim 2, wherein the transaction data is provided in a block of a blockchain, and wherein the timestamp is included in the block.

5. The edge computing device of claim 4, wherein the blockchain is a permissioned blockchain.

6. The edge computing device of claim 4, wherein the timestamp signature is generated at the trusted hardware environment of the another entity using a nonce and a cyclic redundancy check (CRC) value for the transaction data, and wherein the nonce and the CRC value are provided in the block of the blockchain.

7. The edge computing device of claim 1, wherein the trusted hardware environment of the another entity is attested to the edge computing device based on a hardware root of trust known to the edge computing device.

8. The edge computing device of claim 1, wherein the transaction data is provided as a portion of a transaction data set, and wherein a previous version of the transaction data set is indexed at the edge computing device in an index, the processing circuitry further configured to perform operations to:
   identify, based on the transaction data, a value of the index which corresponds to the portion of the transaction data set, wherein the value of the index corresponds to the previous version of the transaction data; and
   set the value of the index, in response to a timestamp value changing for the portion of the transaction data set, wherein the value of the index is set to indicate a changed version of the transaction data within the transaction data set.

9. The edge computing device of claim 8, wherein the operations to perform the transaction in the edge computing device are conducted based on values of the index, to update respective portions of the transaction data set based on an indication of a changed version for the respective portions of the transaction data set, as indicated by the index.

10. The edge computing device of claim 1, wherein the another entity is a second edge computing device, and wherein clocks used to generate timestamps at the edge computing device and the second edge computing device are coordinated with synchronization performed according to a Precision Time Protocol.

11. The edge computing device of claim 1, wherein the timestamp signature is generated using a private key provided from an asymmetric encryption process, and wherein the validation of the timestamp signature is performed based on validation of the timestamp and the transaction data using a public key corresponding to the private key.

12. The edge computing device of claim 1, further comprising:

a storage device, hosting data for a data store;
wherein performing the transaction causes the transaction data to be written to the data store.

13. The edge computing device of claim 12, wherein performing the transaction in the edge computing device causes an update of a prior version of the transaction data in the data store, wherein the update of the transaction data in the data store is tracked within a bitmap index.

14. The edge computing device of claim 1, wherein the operations to verify the timestamp for the transaction are based on hardware operations performed in circuitry of the edge computing device.

15. The edge computing device of claim 1, further comprising:
network interface circuitry to receive the transaction data, the timestamp, and the timestamp signature via a network of the edge computing system;
wherein the coordinated timestamp procedure is performed using a network-coordinated timestamp coordination procedure between a system clock of the edge computing device and a system clock of the another entity, and wherein the edge computing device and the another entity deterministically relate a coordinated timestamp at the respective system clocks using hardware cross-timestamps.

16. A method performed by an edge computing device of an edge computing system, and the method comprising:
obtaining transaction data, a timestamp, and a timestamp signature for a transaction, the timestamp generated from a coordinated timestamp procedure at another entity of the edge computing system, and the timestamp signature generated from a trusted hardware environment of the another entity based on the timestamp and the transaction data; and
verifying the timestamp for the transaction based on validation of the timestamp signature and the transaction data for the transaction; and
performing the transaction in the edge computing device, using the transaction data, in response to successful verification of the timestamp.

17. The method of claim 16, wherein the transaction is conducted at the edge computing device using a value of the timestamp.

18. The method of claim 17, wherein the transaction is a multi-version concurrency control (MVCC) database transaction, wherein the MVCC database transaction is performed using a time value of the timestamp.

19. The method of claim 17, wherein the transaction data is provided in a block of a blockchain, and wherein the timestamp is included in the block.

20. The method of claim 19, wherein the timestamp signature is generated at the trusted hardware environment of the another entity using a nonce and a cyclic redundancy check (CRC) value for the transaction data, and wherein the nonce and the CRC value are provided in the block of the blockchain.

21. The method of claim 16, wherein the transaction data is provided as a portion of a transaction data set, and wherein a previous version of the transaction data set is indexed at the edge computing device in an index, the method further comprising:
identifying, based on the transaction data, a value of the index which corresponds to the portion of the transaction data set, wherein the value of the index corresponds to the previous version of the transaction data; and
updating the value of the index, in response to a timestamp value changing for the portion of the transaction data set, wherein the value of the index is updated to indicate a changed version of the transaction data within the transaction data set.

22. At least one non-transitory machine-readable storage medium comprising instructions, wherein the instructions, when executed by a processing circuitry of an edge computing device, cause the processing circuitry to perform operations that:
obtain transaction data, a timestamp, and a timestamp signature for a transaction, the timestamp generated from a coordinated timestamp procedure at another entity of the edge computing system, and the timestamp signature generated from a trusted hardware environment of the another entity based on the timestamp and the transaction data;
verify the timestamp for the transaction based on validation of the timestamp signature and the transaction data for the transaction; and
perform the transaction in the edge computing device, using the transaction data, in response to successful verification of the timestamp.

23. The machine-readable storage medium of claim 22, wherein the transaction is conducted at the edge computing device using a value of the timestamp, and wherein the trusted hardware environment of the another entity is attested to the edge computing device based on a hardware root of trust known to the edge computing device.

24. The machine-readable storage medium of claim 22, wherein the transaction is a multi-version concurrency control (MVCC) database transaction, wherein the MVCC database transaction is performed using a time value of the timestamp.

25. The machine-readable storage medium of claim 22, wherein the transaction data is provided in a block of a blockchain, wherein the timestamp is included in the block, wherein the timestamp signature is generated at the trusted hardware environment of the another entity using a nonce and a cyclic redundancy check (CRC) value for the transaction data, and wherein the nonce and the CRC value are provided in the block of the blockchain.

* * * * *